Figure 1:
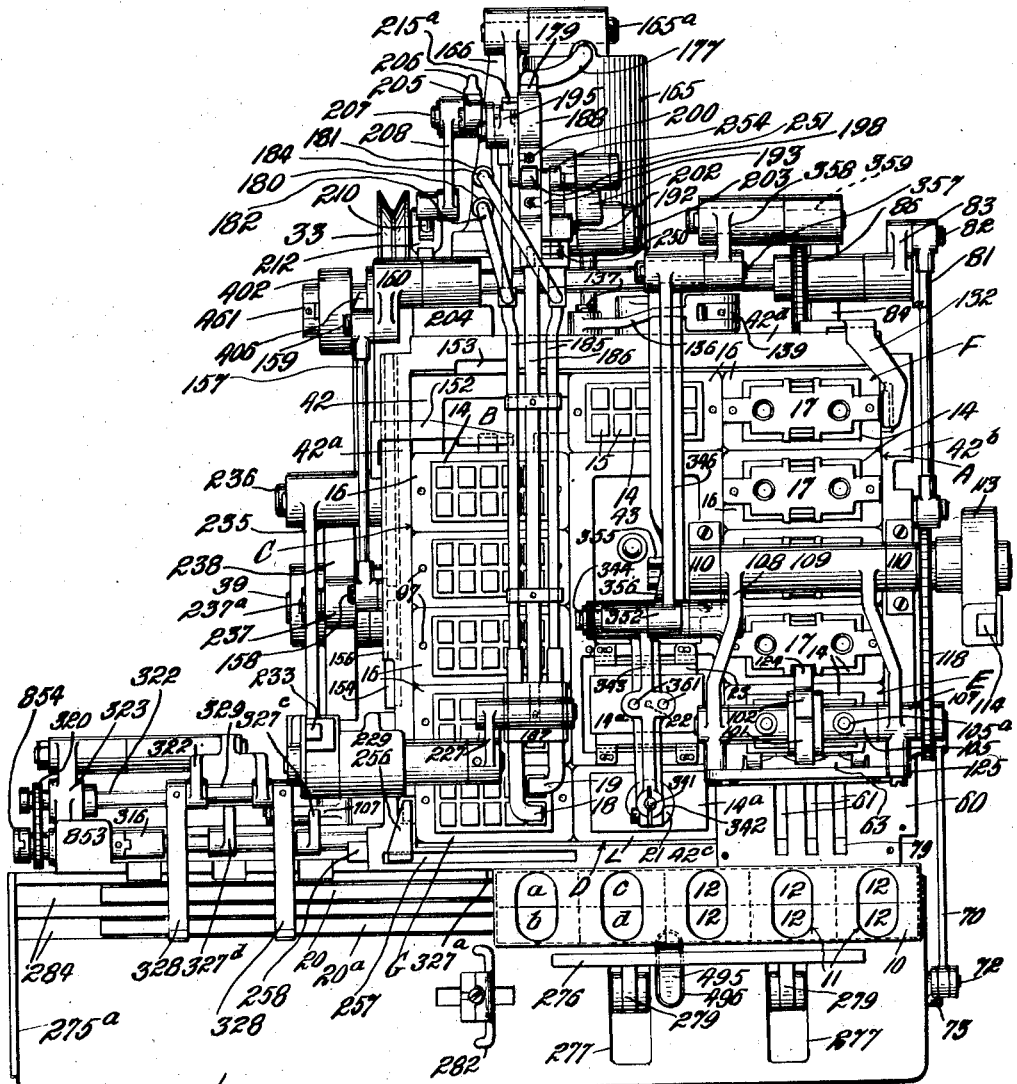

May 17, 1938.  F. X. MALOCSAY  2,117,618
MACHINE FOR APPLYING DECALCOMANIAS
Filed July 21, 1937  15 Sheets-Sheet 1

INVENTOR
FRANCIS X. MALOCSAY
BY
Harry Radzinski
ATTORNEY

May 17, 1938.　　　F. X. MALOCSAY　　　2,117,618
MACHINE FOR APPLYING DECALCOMANIAS
Filed July 21, 1937　　　15 Sheets-Sheet 2

INVENTOR
FRANCIS X. MALOCSAY
BY
Harry Radzinsky
ATTORNEY

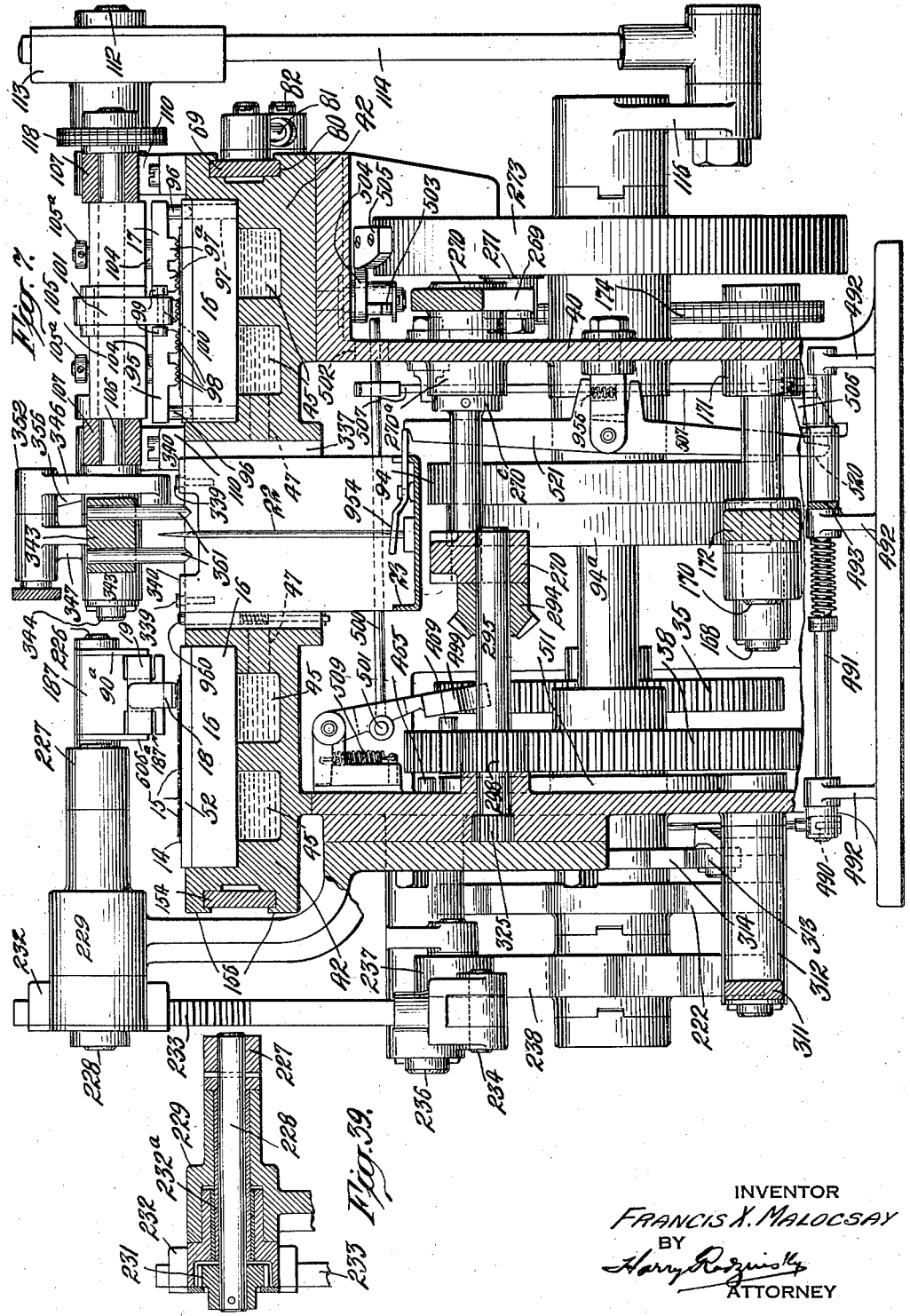

May 17, 1938.  F. X. MALOCSAY  2,117,618
MACHINE FOR APPLYING DECALCOMANIAS
Filed July 21, 1937   15 Sheets-Sheet 8
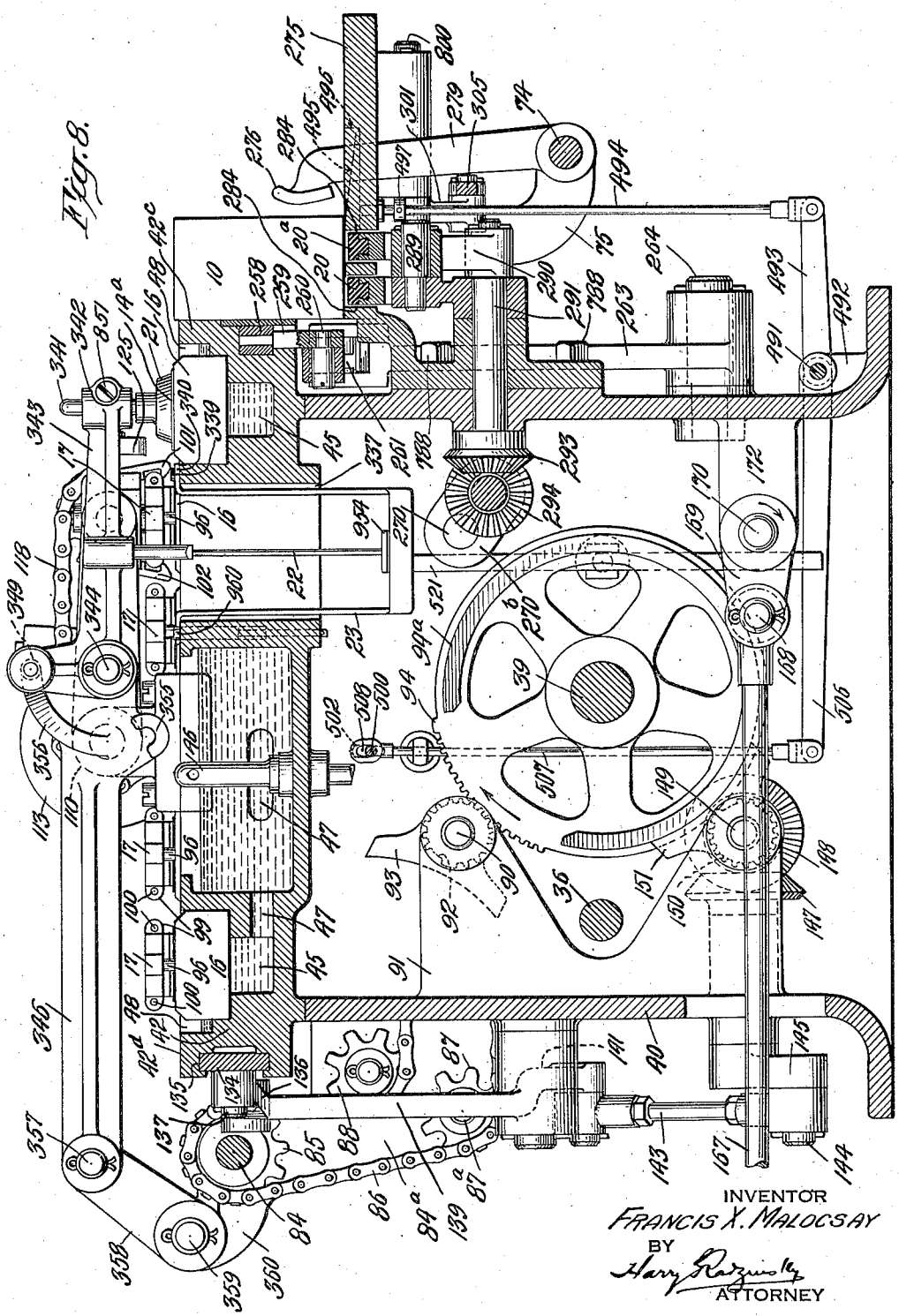
INVENTOR
FRANCIS X. MALOCSAY
BY
Harry Glazuisky
ATTORNEY May 17, 1938.  F. X. MALOCSAY  2,117,618
MACHINE FOR APPLYING DECALCOMANIAS
Filed July 21, 1937  15 Sheets—Sheet 9
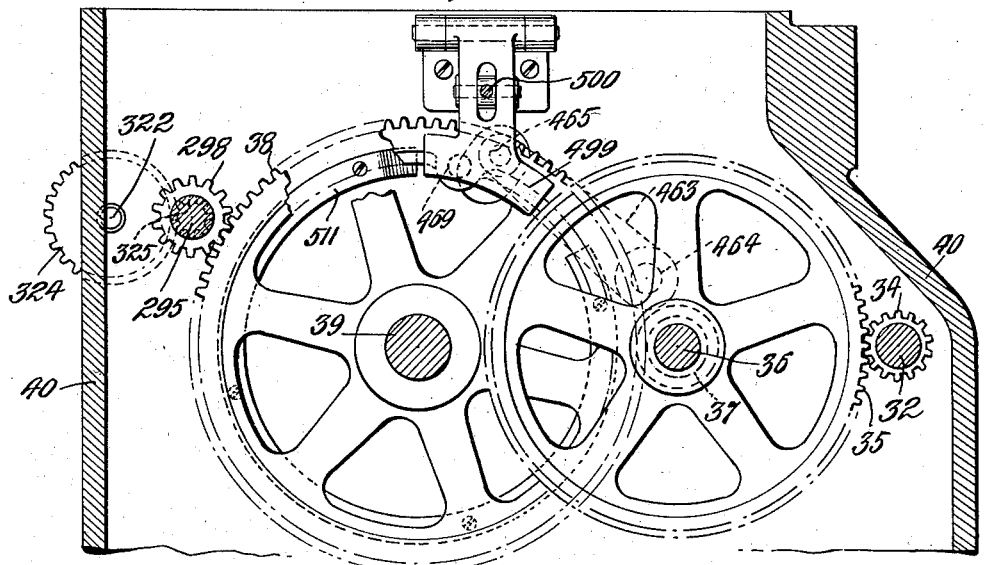
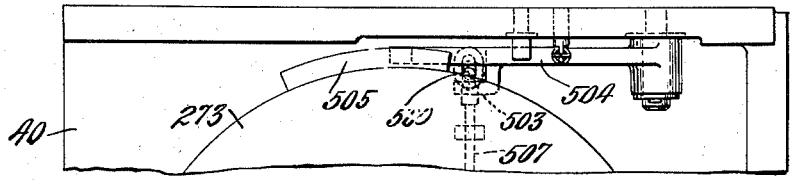
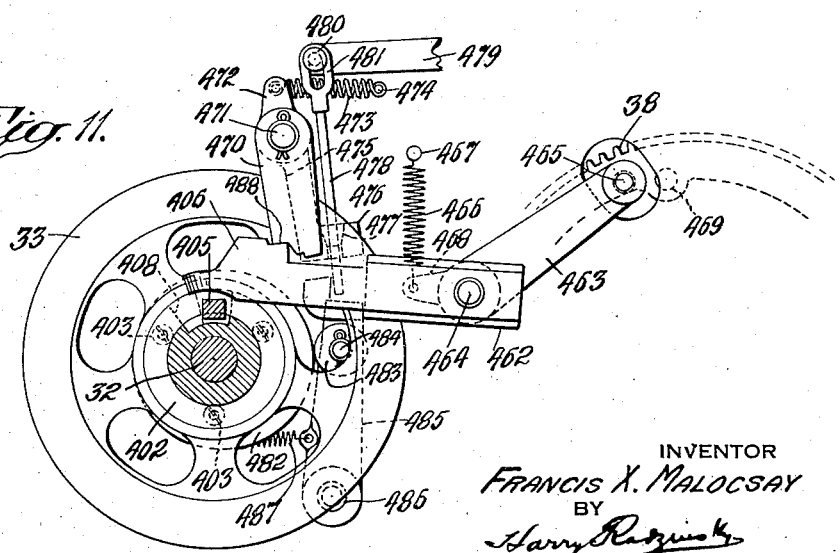
INVENTOR
FRANCIS X. MALOCSAY
BY
ATTORNEY

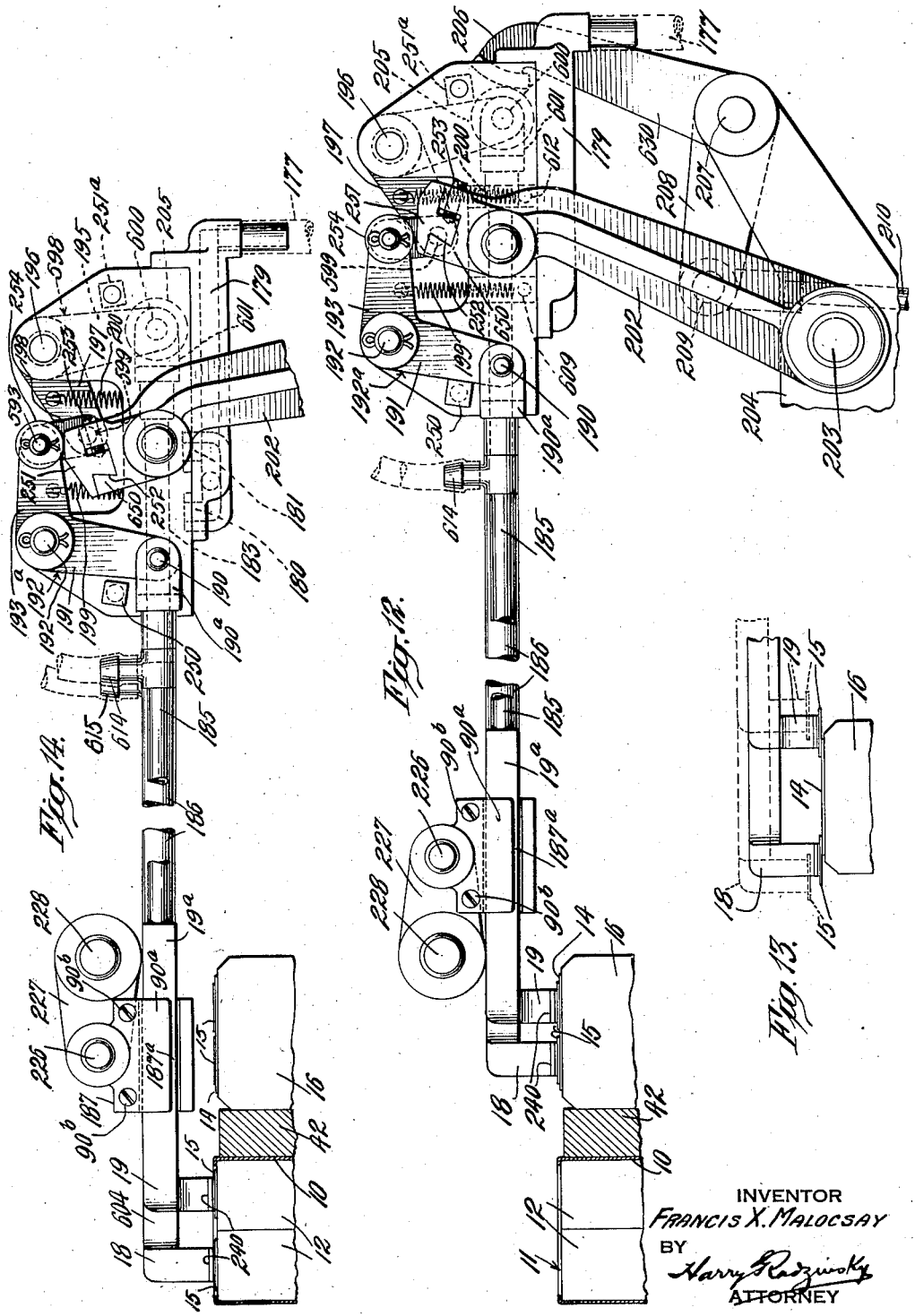

May 17, 1938. F. X. MALOCSAY 2,117,618
MACHINE FOR APPLYING DECALCOMANIAS
Filed July 21, 1937 15 Sheets-Sheet 11
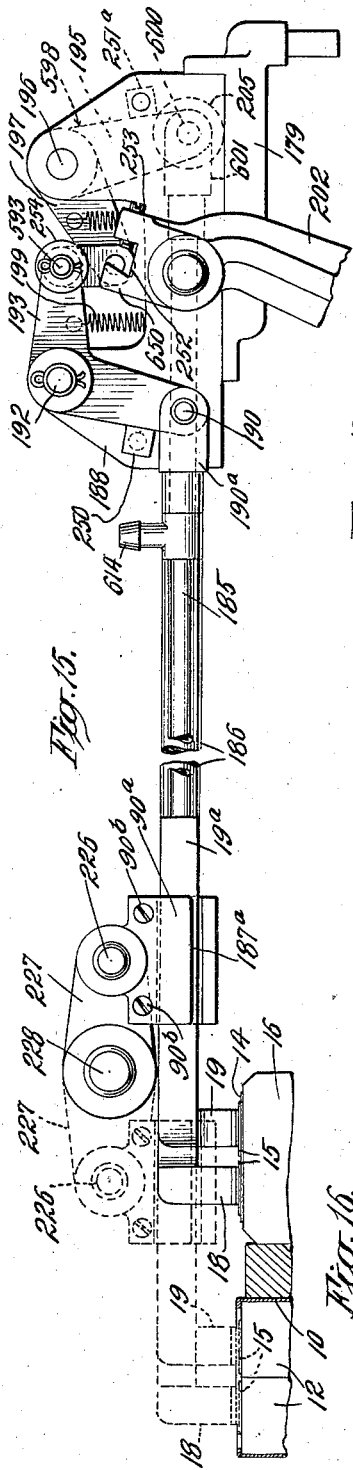
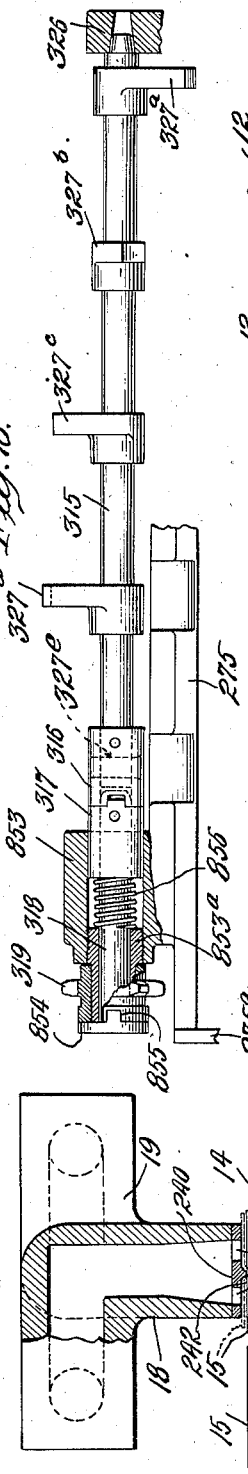
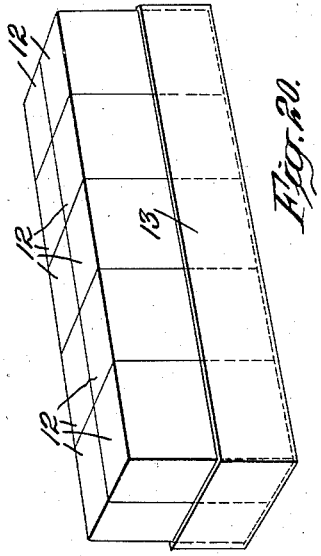
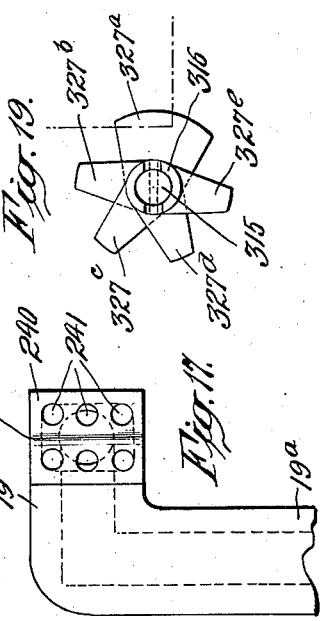
INVENTOR
FRANCIS X. MALOCSAY
BY
ATTORNEY

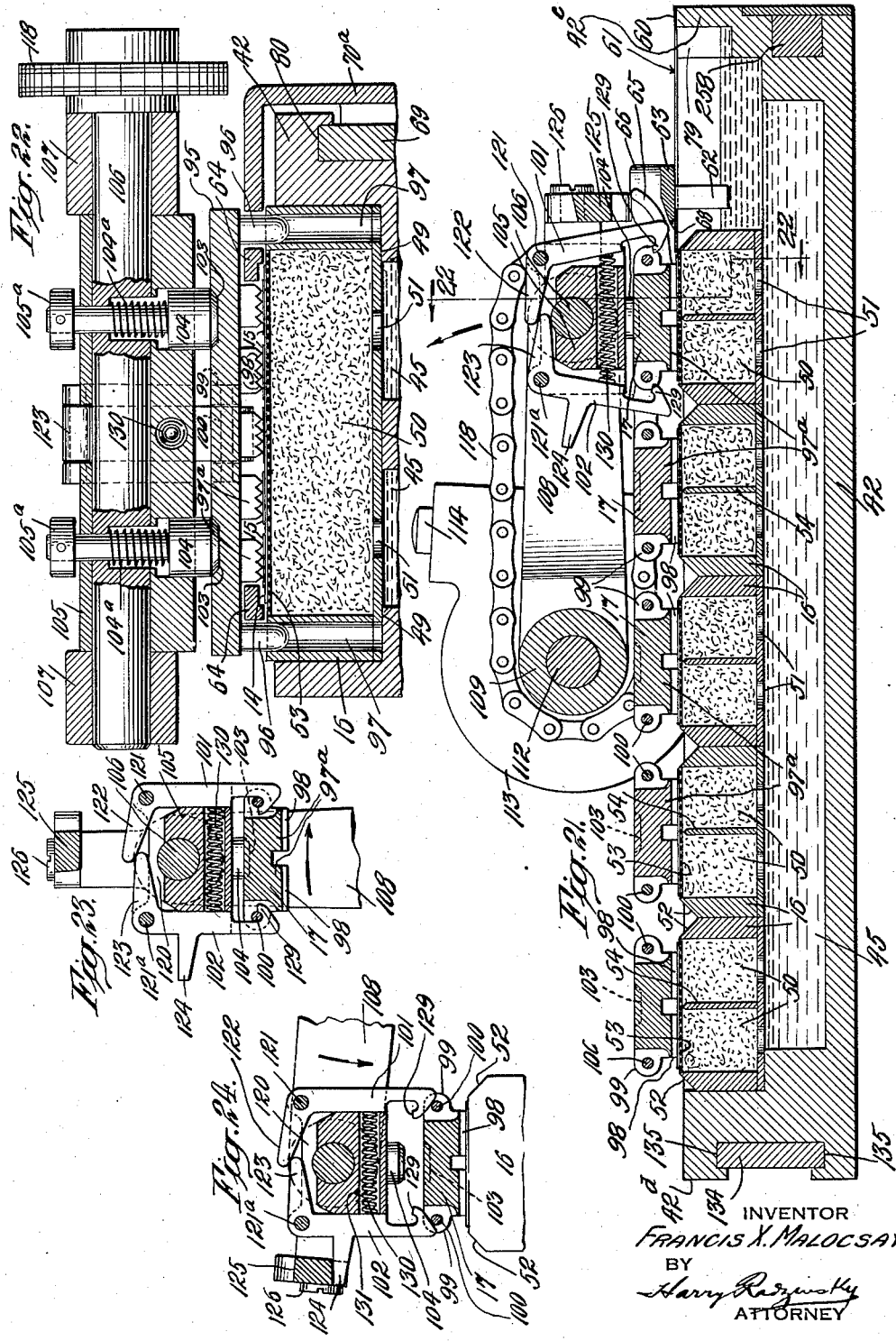

May 17, 1938. F. X. MALOCSAY 2,117,618
MACHINE FOR APPLYING DECALCOMANIAS
Filed July 21, 1937 15 Sheets-Sheet 13
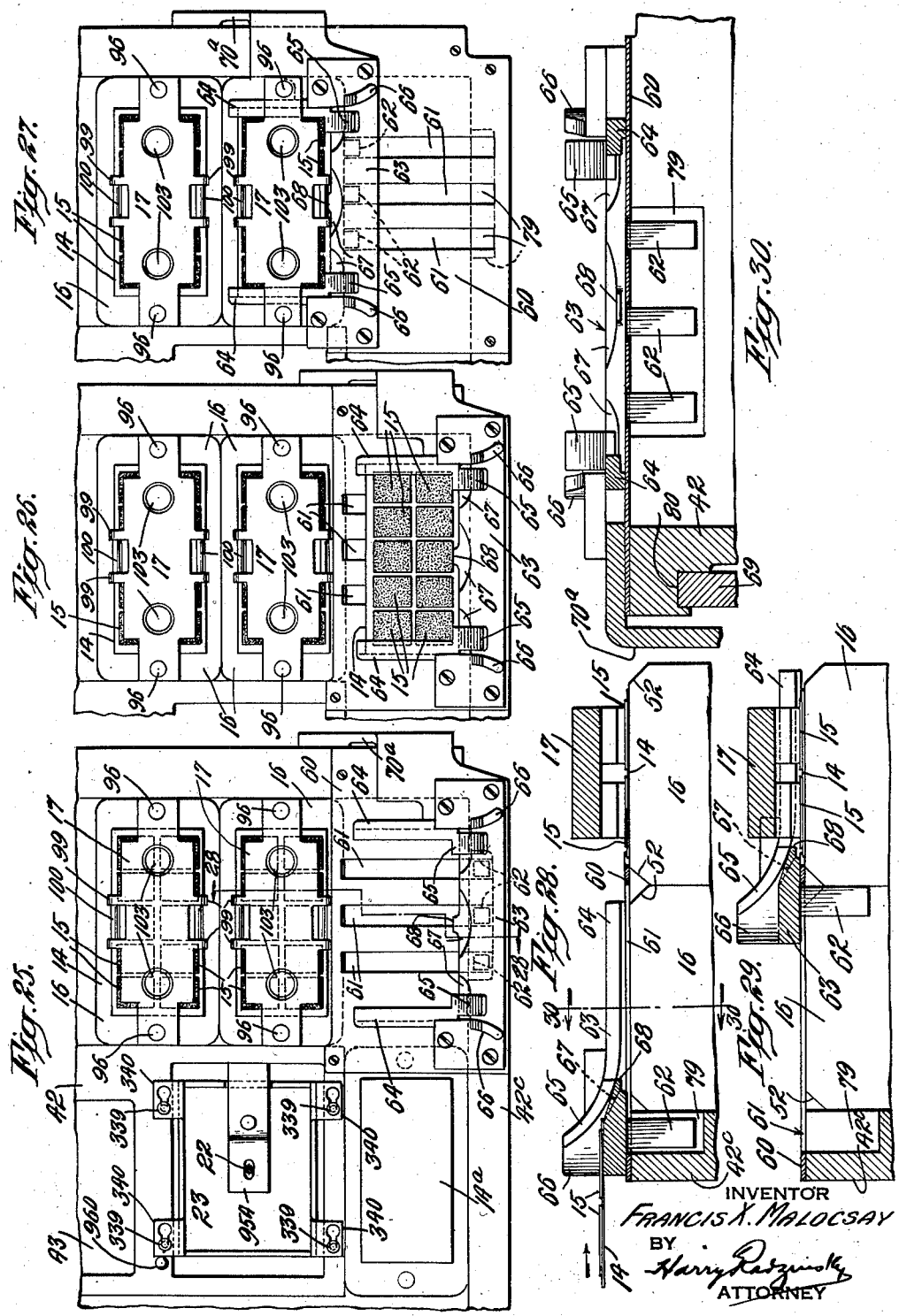
INVENTOR
FRANCIS X. MALOCSAY
BY
ATTORNEY

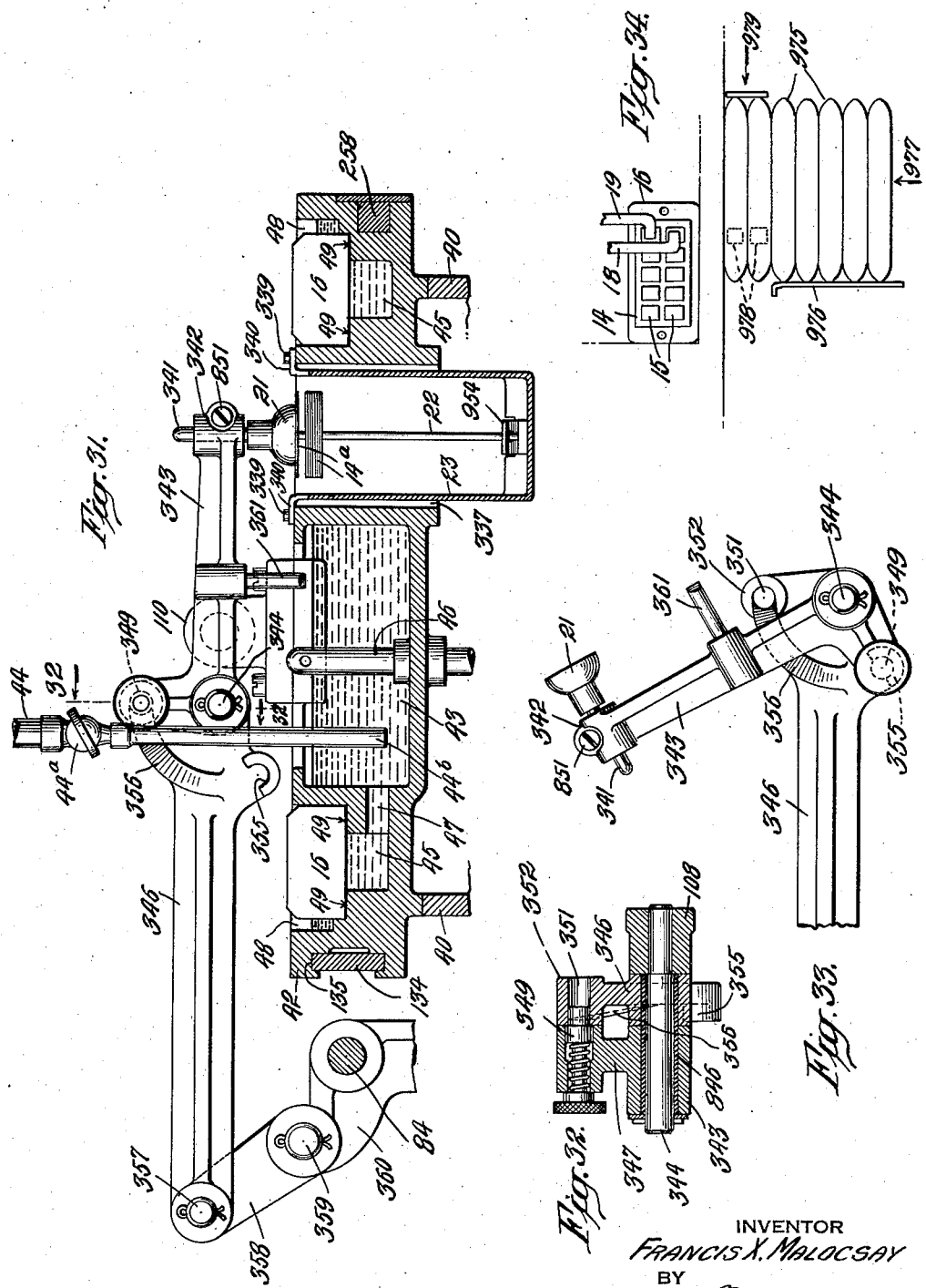

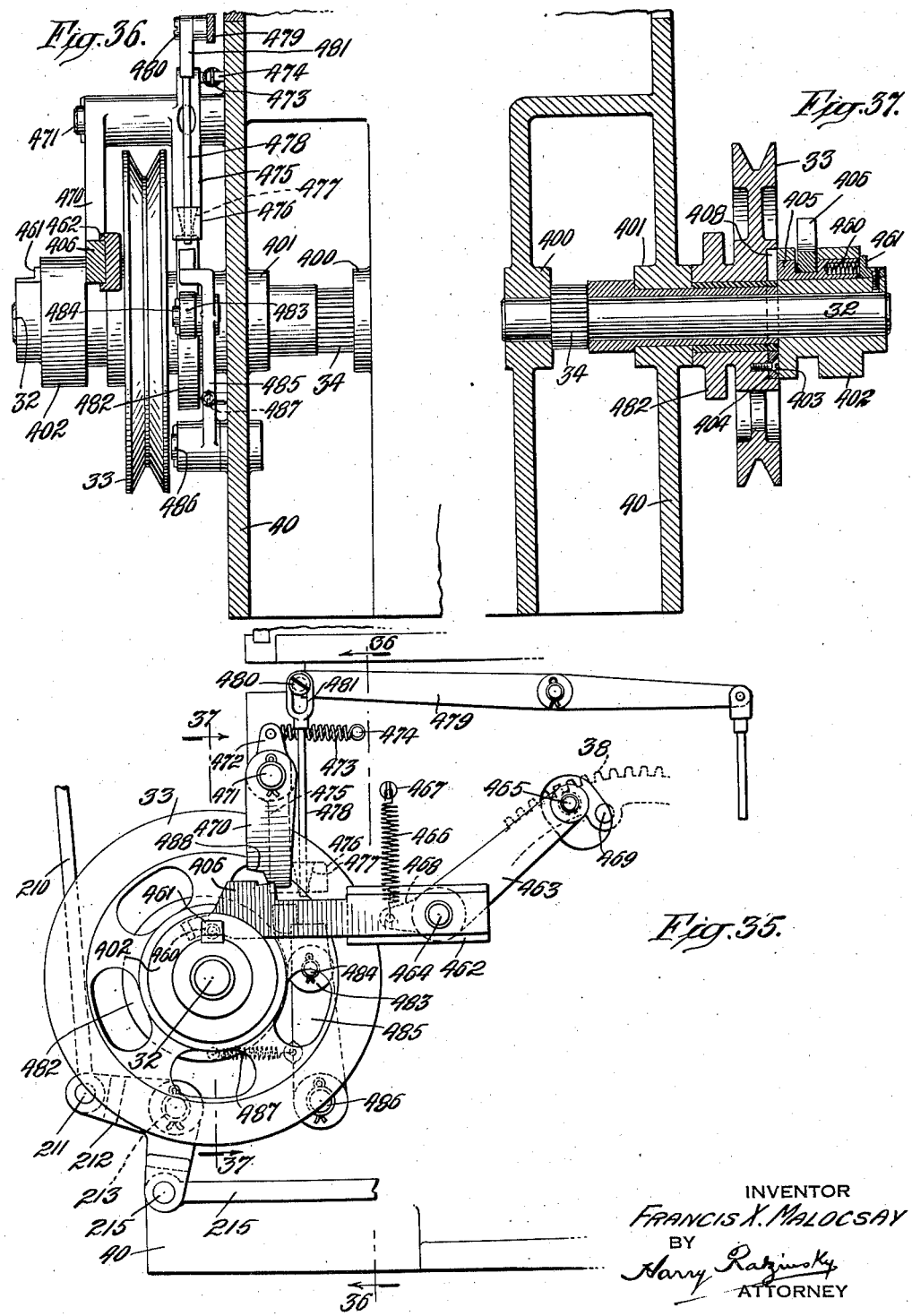

Patented May 17, 1938

2,117,618

UNITED STATES PATENT OFFICE 2,117,618

MACHINE FOR APPLYING DECALCOMANIAS

Francis X. Malocsay, Upper Saddle River, N. J.

Application July 21, 1937, Serial No. 154,719

63 Claims. (Cl. 41—1)

This invention relates to a machine for applying decalcomanias and has for its object the provision of a machine of this character which will speedily, accurately and effectively apply the decalcomanias to any articles intended for their reception.

A decalcomania of the character applied by the improved machine and as made at the present time usually consists of a film-like element composed of a gum or adhesive and including one or more layers of inks or paints constituting the printed matter, the film-like body of the decalcomania being adhesively attached to a paper or similar supporting sheet or backing by an adhesive that is solvent in water to separate the decalcomania from the paper backing. A decalcomania is applied to an article by first separating it from the paper backing, which is usually done by an application of water, and when the decalcomania becomes loosened from its backing, it is bodily removed therefrom and pressed against the article to which it is to be attached, and the gum or adhesive incorporated as a part of the decalcomania will cause it to permanently adhere to the article to which it is thus applied.

This type of decalcomania is widely used, and up to the present time has been applied by hand operation only. Decalcomanias are used for many purposes, one of which is for the formation of tax stamps such as are applied to packages of cigarettes and possibly to many other articles of merchandise sold throughout the country. The application of these tax stamps is now performed by hand and imposes considerable hardship upon the tobacco dealer in the localities where it is required that these stamps be affixed to each package of cigarettes. As delivered by the manufacturer to the tobacco dealer, cigarettes are packed in sealed cartons, usually with ten packages contained in each carton. When the dealer in a particular locality where the law requires the application of tax stamps, receives his cigarettes from the manufacturer, he must open each carton, remove the packages of cigarettes therefrom, apply a decalcomania tax stamp to each package, restore the packages to the carton from which they were taken and then re-seal the carton. This requires handling of the cigarette packages more than was ever contemplated by the manufacturer; it requires opening of the cartons so that the ultimate purchaser of a carton of cigarettes does not receive it in the original sealed condition in which it left the factory, and the tobacco dealer is put to the expense of maintaining a staff of workers for the purpose of applying the stamps, thus greatly increasing his overhead cost and in many cases preventing the making of a reasonable profit on his cigarette sales.

One of the primary objects of the invention therefore is to provide an automatic machine by which decalcomania tax stamps of the character described may be applied to cigarette packages or any other articles without requiring the removal of the cigarette packages or other articles from the cartons in which they are initially packed by the manufacturer. In cases where the cartons employed by a particular manufacturer are such as to prevent the application of the decalcomania stamps without removing the packages from the cartons, then the machine will, as effectively, apply the stamps to the packages removed from the cartons and supported in a suitable tray or other receptacle intended for their reception.

Throughout the following description, the decalcomanias are sometimes referred to, for simplicity of expression, as the "stamps" and the articles to which they are applied are sometimes referred to as the "packages". This is done without in any manner intending to limit the machine herein described to the specific application of decalcomania tax stamps to cigarette packages or other articles of the same nature, since the principles hereinafter set forth are such as may be readily utilized by those skilled in the art, in almost any environment where the optimum sought is the speedy, accurate, automatic and effective application of a decalcomania to almost any article or surface intended for its reception or capable of receiving it.

More particularly, the invention contemplates the provision of a machine wherein successive decalcomania-carrying sheets are fed to moistened supports which carry said sheets to decalcomania-applying means and while carrying them to the applying means cause the decalcomanias to become loosened from the backing sheets by the application of moisture; wherein also the decalcomanias so loosened from their backing sheets are drawn away from the sheets by a picker mechanism and are bodily carried to, and successively brought down upon and caused to adhere to the surfaces of the packages moved into position to receive them. The improved machine also includes the provision of means for disposing of the waste backing sheets from which the decalcomanias are detached; it includes also means for preventing operation of the machine when no packages are in position to receive the application of the decalcomanias, and it includes means also for preventing machine operation both when the waste backing sheet holder is full of waste sheets or while the sheet holder is out of the machine being emptied of its accumulated contents or being replaced by another receptacle. These and many other features of novelty are included in the invention, a more particular description of which will hereinafter appear and be set forth in the claims appended hereto.

Figure 38:
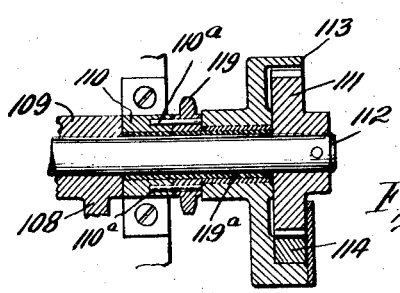
Figure 2:
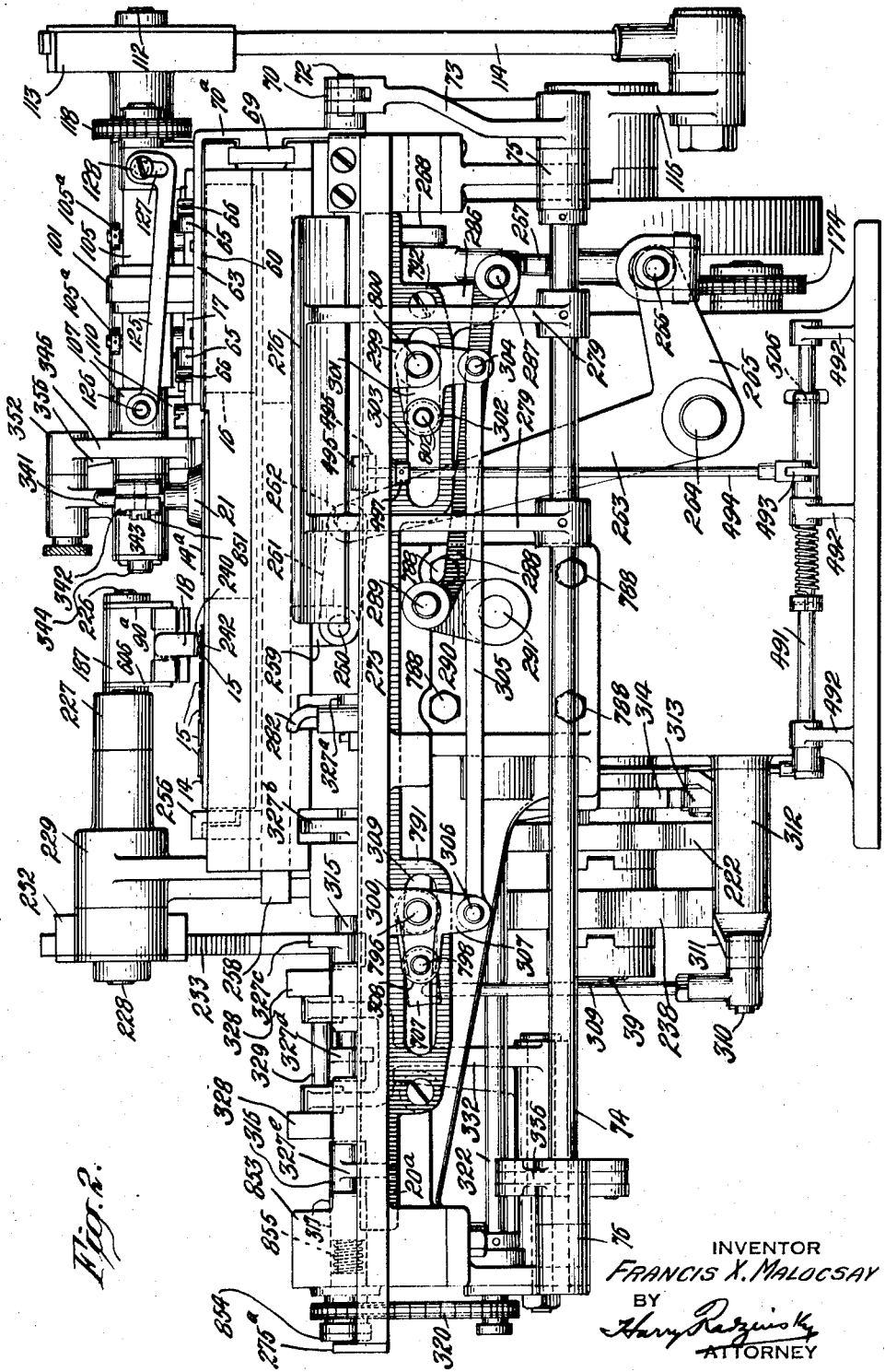
Figure 3:
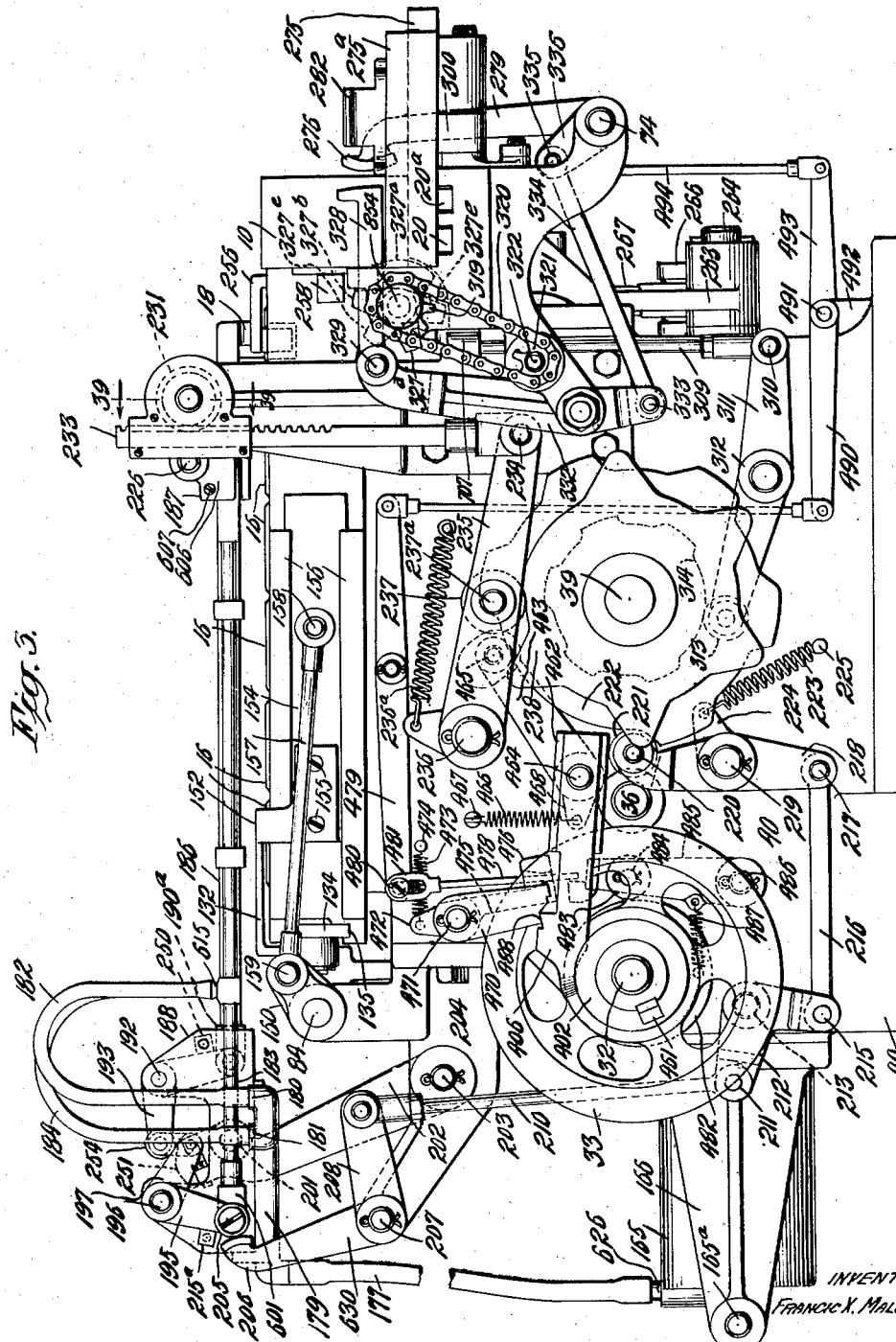
Figure 4:
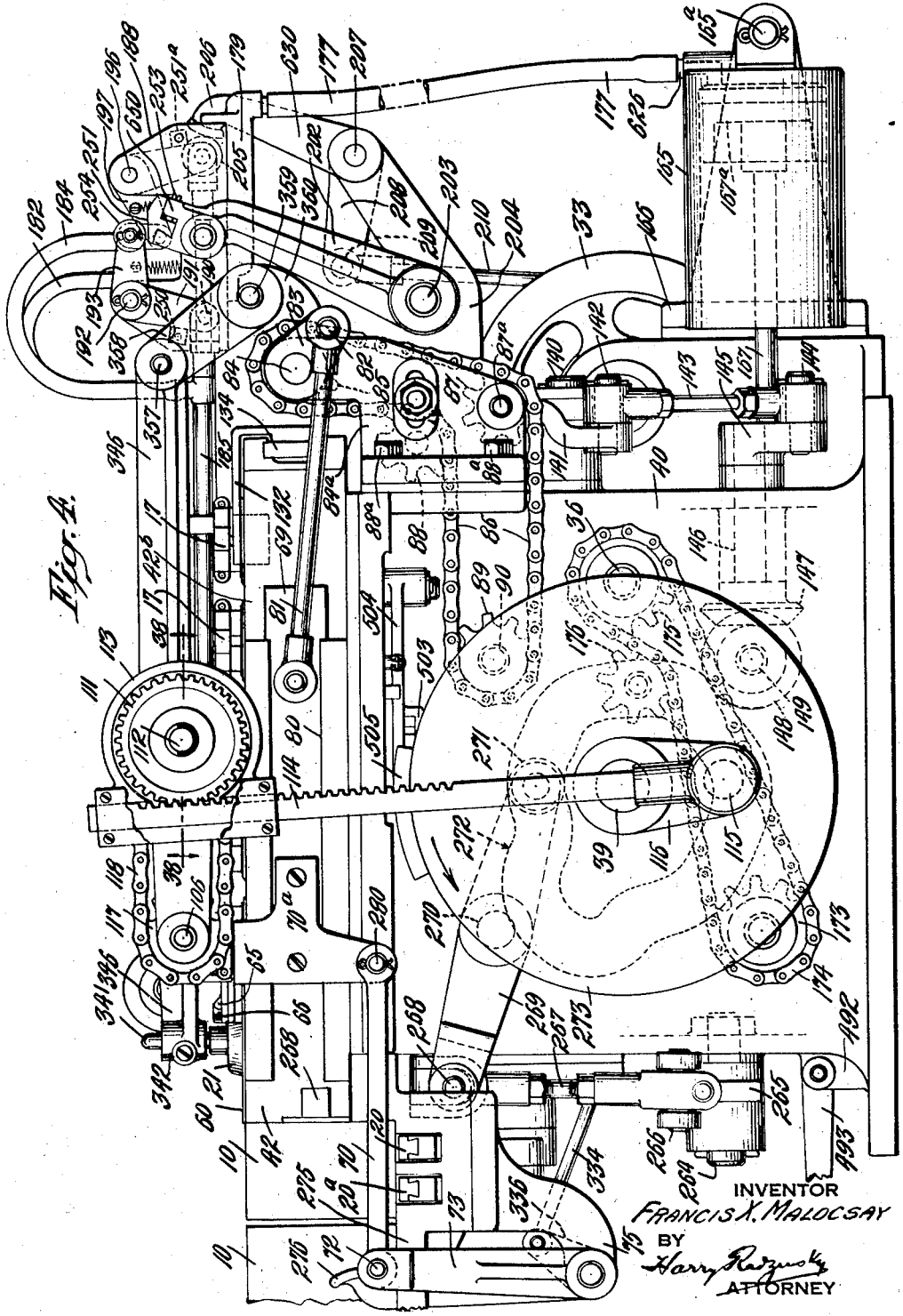
Figure 5:
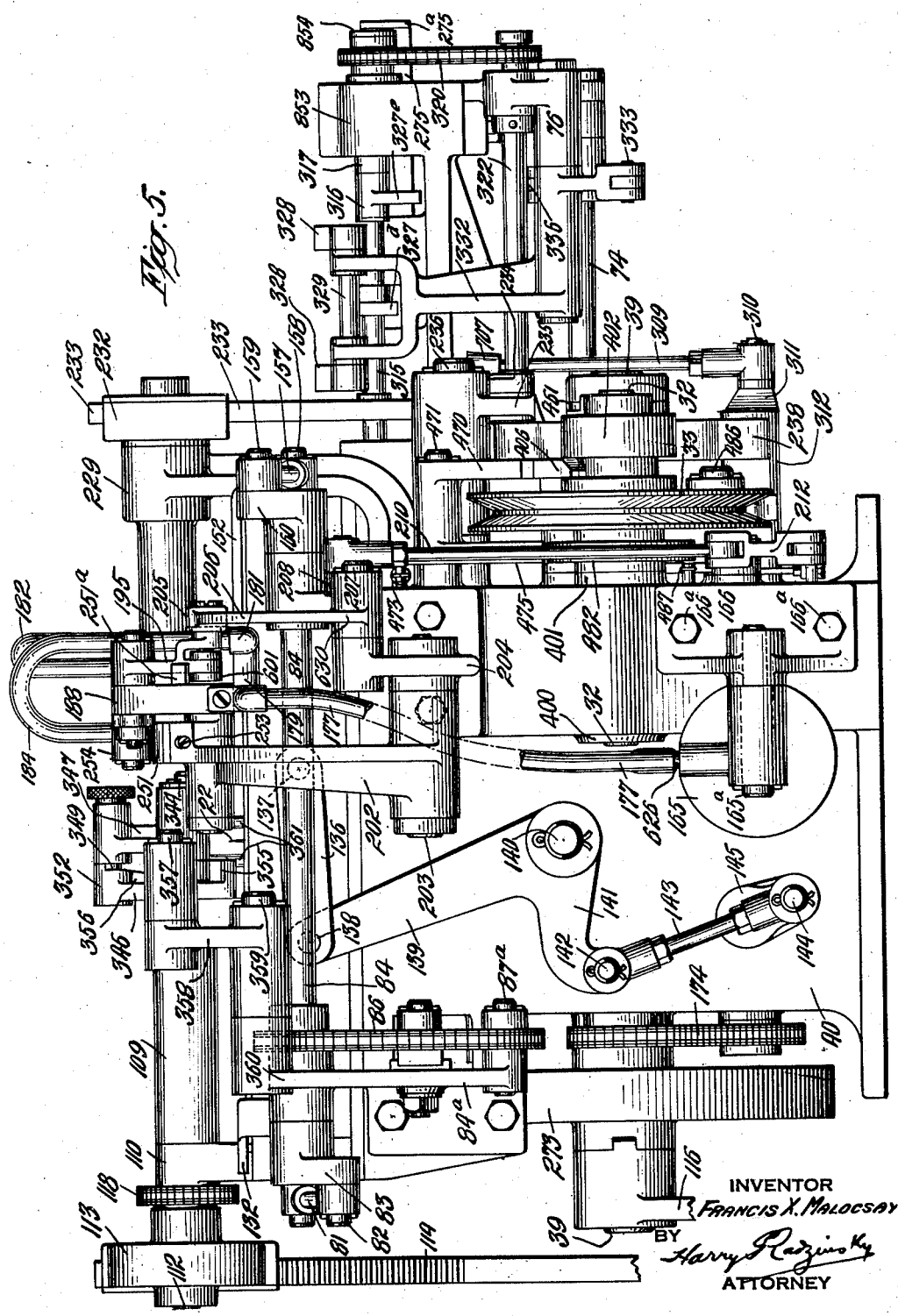
Figure 6:
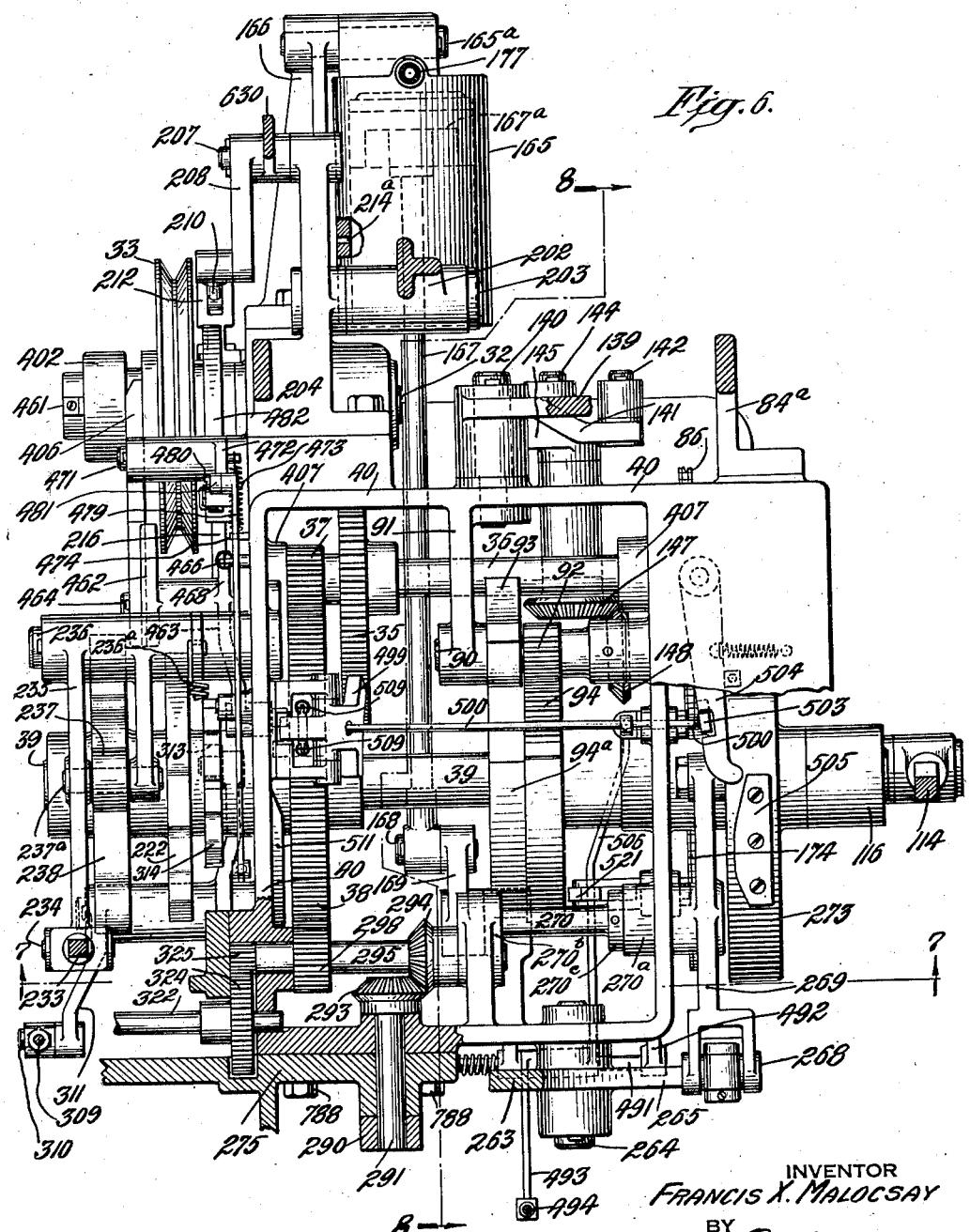

In the accompanying drawings forming a part hereof, Fig. 1 is a plan view of the improved machine; Fig. 2 is a front view of the same; Fig. 3 is a side elevation of the machine as viewed from the left end of Fig. 2, and with certain portions of the upper part of the machine omitted for clearness in illustration; Fig. 4 is a side view of the machine as viewed from the right end of Fig. 2; Fig. 5 is a rear view of the machine with certain parts shown fragmentarily to better disclose construction; Fig. 6 is a plan view of the lower portion of the machine, with the top portion removed or broken away and with parts in section; Fig. 7 is a vertical sectional view through the machine, the view being taken substantially on the line 7—7 of Fig. 6, looking in the direction of the arrows; Fig. 8 is a sectional view on the line 8—8 of Fig. 6, looking in the direction of the arrows; Figs. 9, 10 and 11 are views showing portions of the clutch mechanism controlling the starting and stopping of the machine; Fig. 12 is a side elevation of the picker mechanism, showing the same engaging two decalcomanias preparatory to removing the same from their backing sheet; Fig. 13 is a view of the two picker heads, showing the action of the same in sliding two decalcomanias toward the edge of the backing sheet to then lift the decalcomanias from the sheet; Fig. 14 is a view of the picker mechanism similar to Fig. 12, showing the pickers in the act of applying the two decalcomanias carried by them to two cigarette packages; Fig. 15 is a view of the picker mechanism shown in Figs. 12 and 14 with said mechanism arranged to apply the two decalcomanias on two cigarette packages in the same spaced relationship as the decalcomanias bear to one another while located on their backing sheet; Fig. 16 is a front view of the picker heads with one of the heads shown in section; Fig. 17 is a view of the underside of one of the picker heads; Fig. 18 is a front view, with parts in section, of a shaft provided with stops to properly position the carton so that the packages therein will receive the proper affixment of the decalcomanias from the pickers; Fig. 19 is an end view of said shaft removed from its supporting bearings; Fig. 20 is a perspective view of a tray for holding ten cigarette packages, the tray being used for holding and registering the packages while the decalcomanias are being applied when the cigarette cartons are not apertured as heretofore explained to enable the packages to be stamped while the packages remain in the manufacturer's carton; Fig. 21 is a vertical sectional view through the channel in which the moistening blocks are guided while the decalcomanias are being loosened from their backing sheets, showing the weights employed for holding the sheets and decalcomania stamps thereon down on the moistening blocks and also showing the mechanism for shifting the weights; Fig. 22 is a sectional view on the line 22—22 of Fig. 21, looking in the direction of the arrows; Fig. 23 is a sectional view through a part of the mechanism which shifts the weights for holding the decalcomania sheets on the moistening blocks, show-ing the lifting jaws engaging and carrying one of the weights; Fig. 24 is a similar view, showing the jaws just engaging one of the weights to pick up the same; Figs. 25, 26 and 27 are plan views of the mechanism for the delivery of the decalcomania sheets to the moistening blocks; Fig. 25 showing the sliding sheet feed-plate in position to receive a sheet manually fed to it, Fig. 26 showing a sheet in position with relation to the feed-plate in readiness to be moved thereby to reach a position of rest upon a moistening block; Fig. 27 shows the mechanism in position with the sheet located on the moistening block and a weight deposited on top of the sheet; Fig. 28 is a sectional view on the line 28—28 of Fig. 25, looking in the direction of the arrows, the blocks and weights being shown diagrammatically; Fig. 29 is a view similar to Fig. 28, showing the sheet feed-plate causing a sheet to be deposited on top of one of the moistening blocks; Fig. 30 is a sectional view on the line 30—30 of Fig. 28, looking in the direction of the arrows; Fig. 31 is a side elevation, with parts in section, of the mechanism for picking up the backing sheets after the decalcomanias have been removed therefrom and delivering said sheets to a waste-sheet receptacle; Fig. 32 is a sectional view on the line 32—32 of Fig. 31, looking in the direction of the arrows; Fig. 33 is a side elevation of the backing sheet lifter and carrier, showing the same in the raised or inoperative position in which it may be manually placed while the waste sheet receptacle is being emptied of its accumulated contents; Fig. 34 is a diagrammatic view showing the manner in which the machine may be employed to apply decalcomania stamps directly to cigar wrappers; Fig. 35 is a view of the clutch mechanism, other adjacent portions of the machine being omitted to enable the clutch mechanism to be clearly shown; Fig. 36 is a sectional view on the line 36—36 of Fig. 35, looking in the direction of the arrows; Fig. 37 is a sectional view on the line 37—37 of Fig. 35, looking in the direction of the arrows; Fig. 38 is a sectional view on the line 38—38 of Fig. 4, looking in the direction of the arrows; and Fig. 39 is a sectional view on the line 39—39 of Fig. 3, looking in the direction of the arrows.

At the present time, it is the more or less uniform practice in the cigarette manufacturing industry to pack ten packages of cigarettes in a sealed carton. The cartons are so shaped as to hold the cigarette packages in two layers of five packages to a layer and each package is wrapped in a covering of transparent material, one example of which is known under the trade name of "Cellophane". In a number of States throughout the country, the laws require the affixment of a tax stamp to each package of cigarettes. Dealers and others have found it most convenient to apply these stamps to the ends of the packages, particularly since the stamps may be so applied on the package end so that the tearing off of the "Cellophane" wrapper will destroy the stamp. Since the application of the stamp to the end of the package is more or less uniform practice, the present machine shows the stamps applied to cigarette packages at that accepted position. The stamps sold for the purpose are decalcomanias, that is, the same consist of a layer of adhesive and several layers of ink, the adhesive and inks co-operating to form a very thin, film-like stamp which when once applied to a transparent coating of "Cellophane" attaches itself tenaciously and cannot be removed without resulting in the destruction of the stamp. These decalcomanias are adhesively attached to a paper backing sheet from which they may be loosened by the application of water to the sheet and when detached from the backing sheet they carry sufficient gum to cause them to adhere to the packages or other articles to which they are applied. At the present time, the stamps are supplied for hand application in large sheets of twenty rows of five stamps to a row, the sheets being divided into groups of ten stamps, each group being separated from the next by weakened lines, whereby the large sheet may be divided into small sheets each of which bears ten stamps to correspond to the ten packages of cigarettes in each carton. The present machine is accordingly designed to make use of stamps in these small sheets, each of said sheets bearing ten stamps to accord with the present practice of supplying the stamps to the trade and to the practice of packing ten packages of cigarettes in a carton.

By the employment of a novel type of carton, such as shown in my co-pending application for patent, Ser. No. 105,853, filed October 16th, 1936, it is possible to apply a decalcomania tax stamp to the end of each cigarette package in the carton without requiring the removal of the packages from the carton. Such a carton is shown at 10 in Fig. 1 and it has its rear wall provided with a plurality of spaced window openings 11 through each of which a part of the ends of two cigarette packages 12 are exposed to enable a stamp to be affixed to said exposed portion of each package while the packages remain in the sealed carton. Manufacturers not using such an apertured carton may remove the packages from their carton and place them in a shallow tray 13 in the positions which they occupy in the carton. The tray containing the cigarette packages may be then fed to the stamp-applying mechanism in the same manner as the apertured carton 10.

The decalcomania sheets, each bearing ten decalcomania stamps are indicated at 14 in the drawings, the stamps thereon being each indicated at 15. Each sheet is manually fed in position in the machine and mechanically brought to register with an absorbent moistening block 16, each of said blocks travelling in a continuous water-holding channel, the water therein supplying the required moisture to the blocks to cause the sheets resting on the blocks to become saturated and the stamps to become loosened from the backing sheets. For a portion of the period of travel of the blocks in the channel, weights shown at 17 rest upon the sheets, holding the same down on the moistening blocks and preventing the sheet and the stamps thereon from rising or curling, until the sheet and stamps are thoroughly saturated with the water, when they will remain without assistance flat upon the upper faces of the blocks and without requiring the use of the weights. Then the blocks carrying the sheets with the loosened stamps on their upper faces are moved to a picker mechanism, including suction heads 18 and 19, which remove the stamps, two at a time, by sliding them to the edge of their backing sheet and then lifting them and then affixing them to the ends of two of the cigarette packages 12 in the carton 10 or in the tray 13 shown in Fig. 20. Carrier bars 20 and 20a moved with an upward and forward, then downward and backward movement, shift the carton 10 or tray 13 intermittently to align two packages at a time with the pickers. When all of the stamps 15 have been removed from a backing sheet, the sheet becomes waste, and the vacant or waste sheet is removed from the block which carries it, by a suction cup 21 which carries the waste sheet upwardly and then downwardly to deposit it on a pin or prong 22 located in a waste receptacle 23 clearly shown in Fig. 31.

*Driving mechanism*

The driving mechanism for the machine is mounted in and on a frame housing 40 formed with a base 41 on which the machine rests. The frame 40 carries a clutch shaft 32 (see Figs. 1, 3, 5, 6, 9 and 11). Said clutch shaft 32 rotates in suitable bearings 400 and 401 (Fig. 5). Secured on the free end of said clutch shaft 32 is the clutch drum 402. The bearings 400 and 401 are provided with bushings and the bushing in bearing 401 extends outward from the frame 40, as shown in Fig. 37. Loosely mounted on said extending bushing is the pulley 33. Secured by screws 403 to the pulley 33 is a clutch plate 404 (see Fig. 37) having a notch 408 for the purpose of engaging clutch dog 405. When the dog-stripping arm 406 is raised, in a manner to be later described in connection with the clutch mechanism, and as shown in Fig. 11, this action couples pulley 33 with shaft 32 and sets the machine in motion. Pulley 33 is driven from an electric motor or other source of power by means of a V-belt, not shown. Within the frame housing 40, between the clutch shaft bearings 401 and 402 is a spur pinion 34 (Fig. 9) secured on shaft 32, said pinion meshing with a spur gear 35, secured on shaft 36, mounted in suitable bearings 407 (Fig. 6). The ratio of the pinion 34 to gear 35 is six to one. Secured on shaft 36 is a spur pinion gear 37, meshing with a spur gear 38, secured to the main cam shaft 39 and carried in suitable bearings in the frame 40. The ratio of spur gear 37 to gear 38 is six to one, shaft 39 rotating once to each carton or tray of cigarette packages, while the shaft 36 makes six revolutions, the purpose of which will be hereinafter set forth.

As will be explained hereinafter in detail, the tripping of the clutch permits the cam shaft 39 to make only one revolution, but the continuous feeding of cartons or trays of cigarette packages will, through operation of the clutch mechanism, prevent the clutch from disengaging and as long as the cartons or trays are continuously supplied to the machine, the cam shaft 39 will continue rotating without interruption.

*Clutch mechanism*

The dog 405 of the clutch is held out of engagement with the clutch plate 404 (Fig. 37) by the stripping member 406. A spring 460 (see Fig. 37) in the end of clutch dog 405, the outer end pressing against the member 461, forces the inner end of dog 405 to engage the notch 408 in clutch plate 404, while the pulley 33 is rotating in a clockwise direction when the stripping member 406 is released to permit it to rise slightly.

The stripping member 406 is secured in the recessed portion of the hub 462 of arm 463 carried on frame stud 464 (see Figs. 11, 35 and 36). Inserted in the free end of arm 463 is the stud 465 extending inside the frame 40. A spring 466 having one end attached to spring post 467 and the other end connected to ear 468 of arm 463, tends to keep stripping member 406 raised or in the clutch-dog releasing position, and when in this position the pin 465 carried by the free end of arm 463 is in a lowered position so it will be partly in the path of a pin 469 carried by the spur gear 38 secured in main cam shaft 39. As the gear 38 nears the completion of its revolution in the direction of the arrow, pin 469 will engage pin 465 and move the stripping member 406 down to dog-stripping position (see Figs. 35 and 36) where it is held in this position by latch 470.

The latch 470 is pivotally carried on frame stud 471 and has an upwardly extending spring ear 472 for the reception of one end of a spring 473, the other end of which is attached to spring post 474. The latch 470 has a second downwardly extending arm 475 which is located between the pulley 33 and the frame (see Fig. 36) and has at its lower end an ear 476 having a partly tapered hole 477 therein acting as a guide for the lower free end of a rod 478 carried on the free end of a rocking arm 479 by stud 480 located in the slotted upper end 481 of the rod. The pulley 33 carries a cam 482 having its face engaging the cam roller 483 on stud 484 secured in a tripper arm 485 carried on frame stud 486. A spring 487 keeps the roller 483 against the cam 482 which moves the arm back and forth during each revolution of the pulley 33. The upper end of arm 485 is so shaped as to engage the lower end of rod 478 when said rod is lowered by the downward movement of the rocking arm 479 thus moving rod 478 and latch 470 to the right, thereby releasing the dog-stripping member 406 of arm 463. The upward movement of the dog-stripping member 406 is limited by coming in contact with the surface 488 of latch 470, as shown in Figs. 3, 11 and 35. The upward movement of dog-stripping member 406 allows the clutch dog 405 to engage the notch 408 of the clutch plate 404 carried by the rotating pulley 33, thus coupling the pulley with shaft 32 and setting the machine in motion. As the spur gear 38 secured on main cam shaft 39 nears the completion of its revolution the pin 469 engages the pin 465 of arm 463, thus lifting arm 463 and returning the dog-stripping member 406 to its lowered position, the latch 470 holding it in this position, as previously explained. The lowering of the dog-stripping member 406 causes the clutch dog 405 to be withdrawn, stopping any further movement of the machine (see Fig. 35).

If the upper end of the tripper arm 485 happens to interfere with the downward movement of the rod 478, the stud 480 moves down in the slot 481. When the tripper arm 485 moves to its extreme left hand position the rod 478 will then drop into place. With this arrangement of parts, the rock arm 479 may be rocked at any time regardless of the position of the tripper arm 485.

*Sheet feeding and transporting mechanism*

Supported on top of the housing or frame 40 is a water-receptacle 42 having side walls 42a and 42b, a front wall 42c and a rear wall 42d, and provided with a central water supply chamber or reservoir 43 containing a supply of water (Figs. 8 and 31) maintained at a constant level by a water supply received from the feed pipe 44 communicating with a source of supply and carrying pet cock 44a from which extends the flexible hose 44b, leading into chamber 43. The pet-cock may be adjusted so that the amount of water supplied will be slightly in excess of the amount used, an overflow pipe 46 being provided to hold the water in chamber 43 at the required constant level. The reservoir or chamber 43 is surrounded by a channel 45 with which it communicates by several ducts 47 through which water from chamber 43 may flow to keep channel 45 supplied with water at the same height as that in chamber 43 to moisten or saturate the moistening blocks 16 which are moved along in said channel, carrying the decalcomania sheets on their upper faces. The channel 45 is provided with a wider upper portion 48 in which the blocks are movable, said wider upper portion of the channel avoiding raising of the water when the blocks are moved as hereinafter explained, the blocks being supported and moved along on the ledges 49 in the channel. These blocks, shown in detail in Figs. 21 and 22, are hollow and contain an absorbent filling 50, such as felt or any other suitable material capable of taking up and holding moisture sufficiently to thoroughly moisten or saturate the decalcomania sheets while said sheets are being carried on the upper faces of the blocks 16. The bottoms of the blocks are formed with apertures 51 to enable the water in the channel 45 to reach the absorbent material 50 to saturate the same, and the top of each block consists of a foraminous sheet 53 through which moisture from the absorbent material 50 can reach and saturate the decalcomania sheet. The upper edges of each block are beveled as at 52 to facilitate the placement and removal of sheets on the blocks as well as the removal of the stamps from their backing sheet while the sheet is resting on the block. The interior of each block may be also provided with a partition 54 to aid in supporting the foraminous sheet 53 in a perfectly flat position.

The channel 45 in which the blocks are moved is relatively rectangular and is thus composed of the four communicating passages indicated at A, B, C and D. The cycle of movement of each block through the four passages of the channel begins at a point below the feed-plate 60 at the front, right-hand end of the machine, as viewed in Fig. 1. Here a block 16 receives one of the decalcomania sheets by means to be presently described, and said block, carrying the sheet on its upper face, is moved with an intermittent movement toward the opposite end of the passage A, or when viewed as in Fig. 1, toward the top of the figure. As the block is moved along in said passage, it forces the blocks already located in said passage, ahead of it. While the block bearing the decalcomania sheet is being moved along in passage A toward the rear end of the machine, it carries a weight 17 on top of the decalcomania and when the end of passage A is reached, the weight is removed and then the block bearing the moistened sheet is shifted transversely of the machine in passage B or toward the left, as viewed in Fig. 1. When the left end of passage B is reached by the block, it then begins its travel in passage C back toward the front of the machine or toward the lower part of Fig. 1. Upon reaching the forward end of passage C, the pickers 18 and 19 remove the decalcomania stamps 15 two at a time from the sheet 14 and apply said stamps to the cigarette packages 12. When all of the stamps have been removed from the sheet, the block, then bearing the vacant or waste sheet 14a is moved in passage D toward the right. At an intermediate point in passage D the vacant or waste sheet, shown at 14a in Fig. 1, is lifted from the block by suction cup 21 and the then empty block on its next movement, is moved beneath the feed-plate 60 to next receive another decalcomania sheet and proceed through the cycle of operations just described.

Feed-plate 60 is fixedly secured on the upper edge of the water receptacle or tank 42 and overlies the right hand end of passage D of the channel 45. Said plate is formed with three spaced slots 61 in which three dependent legs 62 on a sliding sheet feed member 63 move, said legs in their inoperative position being located in the recess 79 (Figs. 28 and 29) of wall 42c and on their movement in a direction toward the rear of passage A, they engage against the side of one of the blocks 16, then located below plate 60, and move said block before them. At the same time, the sheet feed-member, engaging a sheet then located on the plate 60, moves said sheet along with the block to a point beyond the end of plate 60, where said sheet, no longer having the support of plate 60, will come to rest on top of the block 16 located below it. The sheet feed member 63 (shown in detail in Figs. 25 to 30) consists of a plate provided with a pair of spaced side guides 64 formed with upturned ends 65 to facilitate the insertion of the sheet between said guides and also provided with outwardly turned guide members 66 to further assist in the proper placement of the sheet on plate 60 and in proper position in respect to the feed member. The feed member 63 is also depressed as at 67 to further facilitate the entry of the sheet, and the forward edge of the member 63 is formed with a lip 68 which overlies the adjacent edge of the sheet when the sheet is in place between guides 64, thus holding the sheet aligned in the guides and preventing rising up of the sheet when it is moved along on plate 60 by sheet feed member 63. In inserting the sheet it is moved in a direction to the rear of the machine, then drawn slightly forward to bring its edge under the lip 68, then moved to the right to bring one of its ends against the right guide 64. This gauges the sheet as the members 64 are spaced to allow for variation in the widths of the sheets.

The sheet feed member 63 is secured by arm 70a to slide 69 (Fig. 4), said slide being reciprocated in a guide groove 80 in the side wall 42b of the water receptacle and being pivotally connected to one end of connecting rod 81 which has its opposite end pivotally connected at 82 to a crank arm 83 secured on shaft 84, shaft 84 being journalled in brackets 84a and 204. A sprocket 85 secured to shaft 84 is connected to drive sprocket 89 secured on the end of a shaft 90. (See Figs. 4 and 5.) An idler sprocket 87 carried on stud 87a secured in bracket 84a acts as a guide for the chain 86 while an adjustable idler 88 applies the proper tension on the chain 86. Bracket 84a is bolted to the frame 40 by bolts 88a and the other end of shaft 90 is supported in the bearing inside frame on bracket 91 (see Fig. 8). Secured on shaft 90 between the frame bearing and bracket 91 is the interrupted gear 92 with a position locking shoe 93, the gear 92 meshing with the teeth of the large interrupted gear 94 secured on main cam shaft 39. The gear 94 has a face 94a which engages the locking shoe 95, when the gears 92 and 94 are out of mesh. The gear 94, turning in the direction of the arrow in Fig. 8 rotates gear 92 one revolution which then remains idle while the gear 94 completes its revolution. Thus, as the cam shaft 39 is rotated, shaft 90 will be intermittently rotated through interrupted gears 92 and 94 and the slide 69 moved through the intermediate elements just described. When the slide 69 is moved in the direction of the arrow in Fig. 28 it moves the sheet feed member 63, and said member moves a sheet along on plate 60 to the right in said figure, the dependent legs 62 engaging against a moistening block 16 then located below plate 60 so that sheet and block are moved together until they meet beyond the end of plate 60 when the sheet will then come to rest upon the foraminous top 53 of the block. The block so moved will, upon such movement, force the block located ahead of it in passage A of channel 45 one step nearer to the rear of said passage.

*Means for holding sheets down on moistening blocks*

When a decalcomania sheet is placed upon one of the moistening blocks and the moisture from the absorbent padding in the block reaches the sheet, the sheet tends to curl or distort upwardly from the face of the block. To prevent this occurring and to hold the sheets flat on the foraminous top of each block for a certain period of travel of each block (or, in other words, during the time that a block is moving in passage A of channel 45), a weight 17 is placed on top of each of the sheets as soon as each sheet is brought to rest by the sheet feed member 63 on top of one of the blocks 16. Each weight, shown in detail in Figs. 22 and 25 to 27 inclusive, consists of a plate 95 formed at each of its opposite ends with a downwardly extending guide pin 96, said pins entering into apertures 97 provided in each of the blocks 16 to thereby properly position the weight with respect to the block on which it is placed. The under side of the plate 95 is formed with two rows of five downwardly extending projections 97a, each of said projections having a serrated face 98 brought into contact with one of the stamps on the sheet. Each of these serrated surfaces is smaller than one of the decalcomania stamps so that the weight on the upper face of the sheet will not have the effect of forcing gum out from under the stamps. These projections contact with the stamps only and not with any portions of the sheet between the stamps. On each of its longitudinal edges, the plate 95 is provided with a pair of ears 99 connected by a bar or rod 100, said bars affording a means by which the weights are picked up and carried by the jaws 101 and 102 of a weight-transferring mechanism to be described. The top of plate 95 is formed with spaced recesses 103 into which spring-pressed plugs 104 of the weight-transferring mechanism fit when a weight is engaged and is held by the carrying jaws 101 and 102.

*Weight transferring mechanism*

The mechanism for shifting or carrying the weights 17 is employed for the purpose of removing each weight from on top of the sheet on a block when the block reaches a position at the rear end of passage A in channel 45, and shifting said weight back to the front end of the passage A to there deposit it on top of the sheet and block that have just been brought together at the rear of the feed-plate 60. In Fig. 1 the weight-shifting mechanism is shown in the position where it deposits a block on top of the sheet and block that have come together after having left the feed-plate 60.

The weight-carrying member 105 which is secured to shaft 106, has a recess 120 extending across the top and downward on each side in which are located the gripping jaws 101 and 102, the gripping jaw 101 being loosely mounted on pin 121 while the gripping jaw 102 is similarly carried on pin 121a, these pins being stationary in the weight-carrying member 105. The gripping jaw 101 has an ear 122 extending laterally and resting upon the top of a similar ear 123 of gripping jaw 102 so that when the gripping jaw 102 swings outward, the gripping jaw 101 will also swing outward in the opposite direction by the force of the spring 130 extending between the jaws through aperture 131 in member 105. The weight-carrying member 105 carries two weight-locating plugs 104, the shanks of which extend upward through apertures in the weight-carrying member 105 and fixed on the upper end of each of the shanks are the collars 105a secured to the same by taper pins. The plugs 104 are depressed to their downward position by the coil springs 104a. In Fig. 21 the weight-carrying member 105 is shown depositing one of the weights 17 on the decalcomania sheet held on the moistening block that has just been moved from under the plate 60. This view shows the weight-carrying member 105 in the lowered position with the weight gripping jaws 101 and 102 moved away from each other by the action of spring 130, their movements away from each other being limited by the ear 123 of jaw 102 coming in contact with the shaft 106 to which the weight-carrying member 105 is secured. As the weight-carrying member 105 is raised in the direction of arrow shown in Fig. 21, the two weight-locating plugs 104 exert a downward pressure on the weight 17 as the weight gripping member 105 starts its travel up and over to engage weight 17 shown in place on the moistening block located at the rear end of passage A of channel 45.

The weight-carrying member 105 is secured on the shaft 106 rotatably mounted in bearings 107 formed on the ends of the arms 108 of a yoke which has its hub 109 secured on a shaft 112 journalled in the bearings 110 secured on top of the water receptacle 42. Secured on shaft 112 is a gear 111 (Fig. 4) located in a gear housing 113, said gear meshing with a rack 114 having its lower end pivotally secured at 115 to a crank arm 116 secured to the shaft 39. By the mechanism just described, the yoke is swung upwardly at the proper time through an arc to cause the member 105 carried by it to be brought downwardly to register with a moistening block 16 located at either station F (Fig. 1) or at station F. During the swinging action of the yoke, member 105 always maintains the same position of suspension from the yoke, since shaft 106 is free to turn in the bearings 107, and shaft 106 is provided with a sprocket 117 over which a chain 118 extends and connects with a sprocket 119. Sprocket 119 is mounted on a bushing 119a (Fig. 38) extending from bearing 110, said sprocket being secured to the bearing by pins 110a. The sprocket 119 is therefore stationary, and the chain moving around said sprocket, rotates sprocket 117 and maintains the member 105 in a horizontal plane at all times. This is clear from Fig. 23 where the yoke is in a substantially vertical position and is swinging downwardly and toward the right, yet the block 105 occupies the same position of suspension in a horizontal plane as it does when the yoke is in either of its lowered positions.

Each of the jaws 101 and 102 is provided with a hooked end 129 adapted to engage over the cross bars 100 on each weight 17. In Fig. 24 the weight-carrying mechanism is shown in the position which it occupies when about to pick up one of the weights 17 from the moistening block 16 located at the rear end of passage A of channel 45, or in other words, at station F. At this time, the bar 125 is resting on lug 124 of jaw 102, causing the ear 123 of said jaw to press upwardly on ear 122 of jaw 101, so that both jaws are in their closest position. As the yoke moves downwardly, or in the direction of the arrow in Fig. 24, the rounded ends of hooks 129 on the jaws ride over the bars 100 on the weight 17, causing the hooks to engage these bars 100 and hold the weight between them substantially as shown in Fig. 23. This action of the jaws 101 and 102 is permitted by the bar 125 which can move upward on its pivot 126 due to its slotted end 127 engaging the pin 128. When the hooks 129 of the jaws engage over bars 100 on the weight, the yoke starts its swinging movement back to the front of the machine or toward station E in the direction of the arrow, as indicated in Fig. 23. Despite the fact that the bar 125 releases pressure on lug 124, the two jaws cannot be spread apart by the action of spring 130 due to the fact that the hooked ends 129 so engage the bars 100 and are held in engagement therewith by pressure of spring 130 and by the downward pressure of the plugs 104 that the bars hold the jaws from swinging outward. When the yoke has swung to the position shown in Fig. 21 and has brought the weight carried by it to rest on top of a decalcomania sheet located on a moistening block at station E, the jaws 101 and 102 are separated by spring 130 on further downward movement of the yoke to release the weight carried by them and allow it to remain on top of the decalcomania sheet on the moistening block. When the weight is brought into contact with the top of the moistening block, a slight relative movement of said weight with respect to the block 105 is had by reason of the spring-pressed pins 104 carried by block 105 and this movement causes the bars 100 to be disengaged from within the hooks 129 on the jaws 101 and 102 (Fig. 21). As soon as these bars 100 are freed from this engagement with the hooks, the spring 130 spreads the jaws 101 and 102 apart, holding the jaws in this open position, as the yoke begins its swing in the direction of the arrow in Fig. 21, to pick up the next weight from the top of a block situated at station F. When the yoke brings the weight-carrying member 105 into position over station F, the bar 125 has been brought into contact with lug 124 and has brought the jaws 101 and 102 toward one another in the position shown in Fig. 24 and the cycle of operations is repeated.

It will be clear from the foregoing, that when each moistening block 16 reaches the point designated as station F it will have carried a decalcomania sheet from station E to station F. The purpose of moving the blocks for this distance in the channel with the weights on the sheets carried by the blocks is to hold down the sheets flat on the blocks until the moisture in the blocks thoroughly saturates the sheets. When station F is reached sufficient time has elapsed to cause the sheets to be saturated with moisture to such an extent as to cause them to lie perfectly flat on the foraminous tops of the blocks so that during further travel of the blocks in the channel 45 to reach the picker mechanism, weights or other hold-down means for the sheets are not required. Hence, each weight is removed at station F and shifted to the blocks as they are presented one after another at station E to receive and bear said weights until station F is reached.

When the weight is removed at station F, the block bearing the moist decalcomania sheet on its upper face then begins its travel transversely of the machine or to the left, through passage B of the channel. Movement of the blocks in this passage is obtained by the pusher arm 132 which normally has its contacting end disposed within recess 133 in the wall 42b of the water receptacle 42 to hold said arm out of the way of blocks moving in passage A. The pusher arm 132 is attached to a sliding plate 134 guided in a groove 135 provided in the rear wall 42d of the water receptacle 42. (See Fig. 8.) Said sliding plate 134 is reciprocated by means of a link 136 (Fig. 5) having one end pivotally connected at 137 to the plate 134, and its other end pivoted at 138 to the arm 139 of a bell-crank lever pivoted on stud 140 projecting from the wall of the machine frame 40. The second arm 141 of the bell-crank is pivoted at 142 to the end of a rod 143 which has its lower end pivoted at 144 to a crank arm 145 secured on shaft 146 carrying a bevel gear 147 meshing with bevel gear 148 on shaft 149 (Fig. 4). Shaft 149 carries a pinion 150 (Fig. 8) co-operating with the interrupted gear 94, and a shoe 151 operative against the portion 94a thereof.

When a moistening block 16 bearing a decalcomania sheet on its upper face, reaches the left end of passage B (as viewed in Fig. 1) of channel 45, it then begins its travel in passage C toward the front of the machine. To move the blocks forward in passage C a pusher arm 152 is provided, said arm in its retracted position having its operative end located in the recess 153 in the rear wall 42d of the water receptacle 42, thereby clearing blocks 16 moving in passage B. Arm 152 is secured by the screws 155 (Fig. 3) to the sliding plate 154 reciprocated in the guides 156 located on the side wall 42a of the water receptacle 42. Rod 157 has one of its ends pivoted on the stud shown at 158 projecting from the sliding plate 154 and has its other end pivotally connected at 159 to a crank arm 160 secured on the shaft 84 driven by the chain 86, as heretofore described, and rotatably mounted in the bearings 84a and 206 secured on the frame. By the intermittent operation of pusher arm 152 the blocks 16, each carrying a moistened decalcomania sheet on its upper face, are presented at the forward end of the passage C at the position designated as station G. Here the stamps are removed from the backing sheet on each block by the suction pickers 18 and 19, and applied to the cigarette packages or other articles.

The picker mechanism

The picker mechanism includes a pump having the cylinder 165 which is secured to bracket 166 by stud 165a, said bracket being secured to the frame or housing of the machine by the bolts 166a. The piston 167a of the pump is connected to a piston rod 167 having its end pivotally attached at 168 (Fig. 8) to crank arm 169 secured on shaft 170. Shaft 170 is rotatably supported in the bearings 171 (Fig. 7) and 172 (Fig. 8) and carries a sprocket 173 (Fig. 4) over which a chain 174 extends, said chain also engaging a sprocket 175 secured on the shaft 36 and held tensioned by the idler 176. The piston or plunger 167a secured to rod 167, when drawn outward, creates a vacuum in the stamp picker heads 18 and 19. As the piston or plunger 167a reaches its extreme outward movement, it registers with the slot 214a (Fig. 6) breaking the vacuum, while the return stroke discharges the air within the cylinder through the stamp pickers 18 and 19.

Carried on stud 203 (Fig. 3) secured in bracket 204 bolted to the frame 40, is an arm 202 which journals the stud 201 secured in the frame 188. A rod 186 has one end secured in frame 188 and the other end secured in a guide block 187. The guide block 187 is carried on the stud 226 secured in the free end of arm 227, secured to the rock shaft 228. The rock shaft 228 is journalled in the bearing of bracket 229. A rack guide 232 loosely mounted on a bushing 232a (Fig. 39) housed within bracket 229 houses a spur gear 231 secured to rock shaft 228. A rack 233 meshing with spur gear 231 has a clevis secured on its lower end (see Fig. 3) which is carried on a stud 234 secured in the free end of cam lever 235 fulcrumed on a stud 236 secured in frame 40. A cam roller 237 carried on stud 237a is actuated by cam 238 secured on cam shaft 39. The cam 238 raises lever 235 against the tension of spring 236a. As the intermediate shaft 36 makes six revolutions to each carton, and the ratio of the gear 37, carried on shaft 36 to the gear 38, carried on the cam shaft 39, is six to one, each revolution of shaft 36 turns cam 238 sixty degrees. Each sixty degree movement of cam 238 raises and lowers cam lever 235. Each raising and lowering of cam lever 235 and rack bar 233 oscillates shaft 228 to which is secured the arm 227 carrying the stud 226 and guide block 187, the latter being rigidly secured to frame 188 through rod 186. The action of the cam 238 causes the guide block 187 to move in an arc from the stamp pickup position to the stamp-applying position, and return. There being five stamping operations to each carton, ⅚ or 300 degrees are required, during the remaining ⅙ or 60 degrees the above mechanism remains stationary in its rearward or stamp pickup position, with the stamp pickers raised slightly so that the moistening blocks may be moved forward, with the first two stamps to be picked off brought into position beneath the stamp pickers.

In frame 188 are secured two studs 192 and 196. The stud 192 carries a bell crank 192a having a downwardly extending arm 191 carrying a stud 190 connecting with the forked end 190a of the tubular portion 185 of the rearward movable stamp picker 19, the square end portion 19a thereof being slidably supported in the recess 187a of the guide block 187, the guide block 187 having a gib plate 90a secured thereto by the screws 90b.

Secured in the arm 193 of the bell crank is a stud 593 which projects from both sides thereof. On one side is carried a cam roller 254, while on the other is carried a small link 198. The link 198 is also connected to the arm 197 of bell crank 598 by the stud 599. The bell crank 598 is carried on the stud 196 secured in the frame 188.

The downwardly extending arm 195 of bell crank 598 carries a stud 600 which carries the forked end 601 of the tubular portion 183 of the forward movable stamp picker 18, the square end portion 604 of the stamp picker 18 being slidably supported in a recess in the opposite side of supporting block 187 which has a gib plate 606 secured thereto by screws 607 (see Fig. 3).

A spring 199 secured on arm 193 extends down through an opening to a spring pin 609. The spring 199 tends to keep the downwardly extending arm 191 of bell crank against the stop 250 projecting from frame 188.

A spring 200 secured to the arm 197 of bellcrank 598 passes through an opening in frame 188 to the spring pin 612 and normally tends to keep the downwardly extending end of bell crank 598 against the stop 251a projecting from the opposite side of frame 188. The stops 250 and 251a control the distance between the centers of the downwardly extending ends or heads of the stamp pickers 18 and 19 which is equivalent to the distance between the centers of the two stamps to be simultaneously removed from the backing by the pickers.

The square portions of the stamp pickers 18 and 19 are slidably supported in the recesses in guide block 187 and move freely between the back of the recesses and the gib plates 90a and 606, while the width of the recesses is greater than the thickness of the square ends of the pickers. This is to allow sufficient space to permit the downwardly extending ends or heads on the pickers to have a movement or "play" of at least $\frac{3}{32}$" up or down so that when the supporting block 187 lowers the pickers, the downward movement of the picker heads 18 and 19 will be checked by the stamps on the backing sheet that is held on the moistening block 16 then positioned below the pickers, as it is important that the supporting block 187 should not exert any pressure nor add any weight to the stamp pickers 18 and 19 during the removal of the stamp from the backing.

The tubular portions 183 and 185 carry hose nipples 614 and 615. The holes in these nipples connect with the tubes 183 and 185 which continue through the square ends to the picker heads 18 and 19, the holes terminating in a square opening at the extreme lower end of the picker heads. Each of these openings is covered by a perforated plate 240. The plates 240 have a plurality of spaced suction holes 241 on each side of the center (see Figs. 16, 17) which connects with the hole leading to the nipples 614 and 615. The surfaces on each side of the center are recessed or relieved by the formation of a tiny central rib 242 so that the weight of the picker heads 18 and 19 will not have a tendency to force the gum between the underside of the stamp and the backing sheet outward, nor to force the entire surface of the stamp forcibly down onto the backing and create an undesirable adherence between the stamp and surface of the backing sheet. The picker heads 18 and 19, with the aid of suction exerted through them, actually "float" the stamps off the backing sheet and beyond the edges of the same for at least half the length of the stamp, by a horizontal movement, and during the remaining half of the separating movement of the pickers, the picker heads are raised gradually (Fig. 13).

Two flexible tubes 182 and 184 connect nipples 614 and 615 with nipples 180 and 181 of a suction-distributing member or manifold 179, while a flexible tube 177 on nozzle 625 leads from manifold 179 to nipple 626 of the intake and discharge pump or cylinder 165.

A roller 205 carried on the stud 600 of bellcrank 195 is in the path of an upwardly extending arm 206 of bellcrank 630 pivoted on stud 207 secured in bracket 204, the arm 208 of the bellcrank being connected to the connecting rod 210 by stud 209. The lower end of connecting rod 210 is connected by stud 211 to an arm 212 of a bellcrank mounted on the frame stud 213. On the free end of arm 214 of the bellcrank is stud pin 215 which pivotally engages one end of the link 216 connected by stud pin 217 to the free end of cam lever 218 carried on frame stud 219. The upper end of cam lever 218 has a stud 220 and cam roller 221. A spring 223 causes cam roller 221 to follow the cam 222 secured on main cam shaft 39. The spring 223 is attached to the ear 224 of cam lever 218, the other end of said spring being attached to frame spring post 225.

As the mechanism starts, the cam 238 lowers the suction picker heads 18 and 19 so that they come to rest on two of the stamps, and suction is applied, cam 222 causing the free end 206 of bellcrank 630 to press against roller 205 thereby moving the lower ends of bellcranks 192a and 195 toward each other and away from the stops 250 and 251a. This action causes the two stamps engaged by the pickers 18 and 19 to be moved away from one another toward the opposite longitudinal edges of the backing sheet and to a point where at least half the length of a stamp is moved beyond the edges of the sheet. This is shown in Fig. 13. When this occurs, the pickers then begin their gradual upward swing by the action of cam 238 and under the impulse of crank 227 as later explained.

The mechanism thus far described provides for the application of the stamps to two packages in the same spaced relation to each other that the stamps had to one another before being removed from the backing sheet. Fig. 15 shows that the stamps are not applied to the center of the packages, while Fig. 14 does show the stamps centrally applied.

In order to have the spaced relation of the stamps on the packages differ from their spaced relation on the backing to thereby accommodate packages of different widths, or to space the stamps as may be required under certain circumstances, the arm 202 carrying the frame 188 has an upwardly extending end portion 650, formed with a dovetail recess 252 and carrying a set screw 253 (see Figs. 12, 14 and 15). A cam face 251 having a downwardly extending dovetail, is inserted and secured by set screw 253 in recess 252. The cam face 251 is beneath the roller 254 of bellcrank arm 193, the shape of cam face 251 being such that when the parts are in the position shown in Fig. 12, the cam does not contact roller 254; therefore the spaced relation of the stamp pickers at this time is the same as the spaced relation of the stamps on the backing. However, when the mechanism moves to the left to bring the stamps to the place of application of the same to the packages, the cam face 251 then raises roller 94, moving the bellcrank arms 191 and 195 toward one another, thereby changing the spaced relation of the pickers 18 and 19 as shown in Fig. 14, which shows the bellcrank arms 191 and 195 moved away from the stops 250 and 251a. Any desired spacing may be had at the stamp-applying position by inserting the properly shaped cam face 251 to hold the pickers at the proper distance apart as the cam 238 lowers the stamp pickers so that they rest on the upper surfaces of the packages in the carton. This is shown in Fig. 14. The result of the action of cam 222 at this point is clearly shown in solid lines in Fig. 13. Further action of both cams 238 and 222 moves the stamp pickers with the stamps carried by them to positions shown in broken lines in Fig. 13. At this point the action of cam 222 rests while cam 238 continues to carry frame 188 to the left. As the frame 188 moves to the left, roller 205 of bellcrank arm 195 is carried away from the roller-pressing member 206 allowing the bellcrank arms 191 and 195 to gradually return to their original position against the stops 250 and 251a. The cam 238 continues to move the stamp pickers with the stamps attached to the left and down against the upper surfaces of the packages 12, clearly shown in broken lines in Fig. 15.

As the stamp pickers arrive in the stamp-applying position shown in Fig. 14 the piston direction of the pump reverses and the air discharged through the suction holes 241 of the stamp pickers 18 and 19 assists in the removal of the stamps therefrom and blows down on the stamps as the pickers rise on their return movement.

Where one size stamp is used and the space relation of the stamps on the backing is to be maintained when the stamps are applied to the packages or articles, the use of the stops 250 and 251a is advisable. If, however, for any reason such as using two sizes of stamps, it is desirable to change the space relation of the stamp pickers 18 and 19 to each other at the stamp pickup position and maintain such spaced relation at the applying position, the stops 250 and 251a may be used for the smaller spacing of the pickers and a cam face 251 of the proper radius may be used, the working surface of the cam face 251 to be concentric with the stud 203, so that the spaced relation of the pickers 18 and 19 will be the same at either the stamp-removing or stamp-applying positions.

If, when using the larger size stamp as stated above and the spaced relationship of the stamp pickers 18 and 19 is to be increased at the applying position (see Fig. 12 which shows the mechanism at the stamp pick-off position) the cam face 251 should be so shaped as to keep roller 254 raised the desired amount so as to obtain the desired spacing apart of the stamp pickers 18 and 19 during the picking-off of the stamps, and so shaped to further raise roller 254 during its travel to the position shown in Fig. 14. Almost any combination of picker spacing can be obtained with a cam face 251 of the proper size and shape.

When the pickers 18 and 19 have applied the first two stamps at the right end of the sheet (shown located directly beneath the pickers in Fig. 1) to the first two cigarette packages at the left end of the carton 10, said package ends being designated as *a* and *b* in Fig. 1, the moistening block on which the sheet is located and from which sheet the stamps are being removed, is shifted to the right to bring the next two stamps below the pickers. The carton 10 must also be shifted in an opposite direction or to the left at this time to bring the ends of the next two cigarette packages in it, which are designated as *c* and *d* in Fig. 1 into the position formerly occupied by packages *a* and *b*. Thus, the moistening block bearing the sheet from which the stamps are being taken is being shifted, step by step, to the right, while the carton is similarly shifted, step by step to the left. Each pause in the movement of the moistening block on which the sheet is carried locates two stamps on the sheet directly beneath the pickers, while each pause in the movement of the carton brings two cigarette packages into alignment with the stamps or in other words directly below the pickers when the pickers descend on the stamp-application stroke.

The means for intermittently shifting the moistening block from which the stamps are being removed by the pickers, includes a pusher arm 256 having a downwardly extending portion movable in slot 257 in the front wall 42c of the water reservoir 42. Said downwardly-extending portion of the pusher arm is secured to slide 258 (Fig. 2) provided with a downwardly-extending lug 259 pivotally secured at 260 to a link 261 having its opposite end pivoted at 262 to the upper end of arm 263 of a bellcrank lever pivoted on a stud 264 on the frame housing and having its other arm 265 connected at 266 by a toggle connection to the lower end of rod 267 which has its upper end connected to the clevis on the end of cam lever 269 by the toggle joint 268. Lever 269 is secured to shaft 270 (Fig. 4) said shaft 270 being journalled in frame bearing 270a and bearing 270b located inside the frame as shown in Fig. 6, and held in place by collar 270c. Lever 269 carries a roller 271 which travels in the cam groove 272 formed in the side of the cam 273 secured on the cam shaft 39. Through the mechanism described, the moistening block carrying the sheet from which the stamps are taken by the pickers, is shifted step by step to the right in Fig. 1, until the ten stamps have been removed from it by the pickers, leaving the vacant backing sheet 14a remaining on the face of the block. The final movement of the pusher arm 256 to the right in Fig. 1 causes the block carrying the waste sheet 14a to be moved to an intermediate position in passage D of the channel 45 where the empty sheet is located in position to be picked up from the surface of the moistening block by the suction cup 21, the operation of which will be hereafter described.

*Carton feed mechanism*

Bolted to the front of the frame 40 is the main feed table 275 secured thereto by the four bolts 788. In the upper horizontal part of the table are two slots 284 which extend the entire width of the table 275. Located and movable within these slots 284 are the two spaced carton carriers or feed bars 20 and 20a having downwardly extending portions 791 and 792, each having a horizontal slot 303 and 309. The upper face portion of the feed bars is covered with friction material, such as felt, rubber or the like to insure against slippage of the bars relative to the carton when the bars are raised and moved to the left to convey the carton. Extending downward from the underside of the horizontal part of the table are the bearings 299 and 300. Mounted in bearing 300 is a shaft 796 which passes through slot 309 and is journalled in the rear of the table 275. Secured to shaft 796 is a bellcrank 307 having a shaft 798 secured to its free end, said shaft carrying a roller 308 which supports the two feed bars 20 and 20a at the left. A shaft 800 journalled in downwardly extending ear 299 on which is secured the bellcrank 301, the free end of which carries a stud shaft 802 on which is mounted a roller 302, supports the two feed bars at the right. The downwardly extending arms of bellcranks 307 and 301 carry studs 306 and 304 respectively and are connected by a link 305 so that they will move in unison.

Extending out from the rear of the frame of table 275, the shaft 796 carries an arm 707 which is engaged by the upper free end of tappet 309 carried on the stud 310 of bellcrank 311 pivoted on frame stud 312. The free end of bellcrank 311 carries a cam roller 313 which is actuated by cam 314 secured on main cam shaft 39. The action of the cam 314 raises and lowers feed bars 20 and 20a five times during ⅚ or 300 degrees, and during the remaining ⅙ or sixty degrees the feed bars are moving in lowered position. The feed bars 20 and 20a are reciprocated from right to left and return. By the action of cam 314 the feed bars are raised slightly above the upper surface of table 275 when moving to the left and are lowered slightly below the surface of the table during the return of the bars to the right.

The carton is moved from one position of stamp application to the next by the action of the feed bars 20 and 20a moving to the left while in their raised position and the stamp application takes place during the time the bars 20 and 20a are lowered by the action of the cam 314 and the bars 20 and 20a are moving to the right while in their lowered position. The bars 20 and 20a are moved from right to left and back again in the following manner:

A crank 290 (Fig. 2) carrying a stud 289 carries one end of a connecting link 288. The other end of link 288 engages a stud 287 secured in the downwardly extending ear 286 of the rear feed bar 20, the arm 290 being secured to shaft 291 journalled in a bearing in the lower part of the frame of table 275 and frame 40 (see Fig. 6). To the inner end of shaft 291 is secured a mitre gear 293 meshing with a companion gear 294, secured on a cross shaft 295 to which is secured a spur pinion 298 meshing with spur gear 38 secured on main cam shaft 39. This arrangement causes the crank 291 to make six revolutions to each revolution of the main cam shaft 39. As there are five positions of stamp application to each carton, the shaft 291 during five of its revolutions moves the feed bars 20 and 20a to the left in raised position, thereby moving the carton one step during each of these five movements. During its sixth revolution, the feed bars 20 and 20a remain in their lowered position while moving to the left, and during this revolution with the feed bars lowered, a carton is fed in position and at the same time the stamped carton is ejected so as not to interfere with the next carton to be stamped. The shape of cam 314 causes raising and lowering of the bars as above described.

The feeding of the carton into position of stamp application is brought about in the following manner:

Attached to the underside of the frame of table 275 are the bearing brackets 75 at the right and 76 at the left. A shaft 74 is journaled in the bearings of these brackets. Secured to the shaft 74 at the right is an arm 73 carrying a stud 72 for the end of link 70 (see Figs. 1-4), link 70 being connected to stud 280 secured in member 70a. When slide 69 is reciprocated it imparts an oscillating movement to rock shaft 74. Secured on shaft 74 by the arms 279 and extending upward through slots 277 in the table 275 is the carton-moving member or pusher plate 276 which moves the carton sideways or rearwardly of the machine into stamp-receiving position. To the left end of rock shaft 74 is attached an arm 336 carrying a stud 335 (Fig. 3) to which is connected a link 334, the other end of which engages a stud 333 of ejecting arm 332, the upper end of which carries a shaft 329 to which are secured the two ejecting bars 328. With this arrangement, as the pusher plate 276 moves the carton sideways into the position of stamp application over the feed bars 20 and 20a, the ejecting bars 328 move the carton bearing the stamped packages forward out of the path of the unstamped carton just moved in position by the pusher plate 276.

The carton marked 10 in position in Fig. 1 has five window openings 11 so that the stamps may be applied to the ten packages therein without removing them from the carton. In order to register each of the five openings with the stamp pickers 18 and 19, the following means is employed (see Fig. 6): On the extreme left end of the cross shaft 295, housed in the frame 40 is a spur pinion 325 meshed with the spur gear 324, secured on shaft 322, the right hand end of which has its bearing in the frame, said shaft extending left to a bearing 323 and carrying on the extreme left hand end, as viewed in Fig. 1, a sprocket 321 (see Fig. 3) which is secured to the shaft 322. The sprocket 321, by means of the chain 320, drives a floating sprocket 319 which rotates the stop-carrying shaft 315 (Fig. 18). The extreme right-hand end of the shaft 315 is tapered and is supported in the tapered bearing 326. Secured to the left hand end of shaft 315 is a female clutch member 316 which is coupled and carried by a male clutch member 317 secured to a shaft 318 which rotates in bearing 853 and in the bushing 853a secured therein. The outer end of shaft 318 carries an enlarged clutch end 854 which engages a notch 855 in the hub of the floating sprocket 319. A coil spring 856 tends to keep the shaft 318 to the right. In order to remove the shaft 315 the enlarged clutch end 854 is manually moved to the left sufficiently to enable the operator to remove the shaft 315 and replace it with one carrying stops of different spacing to correspond with the carton to be stamped. The shaft 315 carries five spacing fingers or stops 327a, 327b, 327c, 327d and 327e. These stops are properly positioned on and secured to the shaft 315 so as to register the window openings 11 in the cartons with the stamp pickers 18 and 19. If the apertured cartons are not used, and it is necessary to remove the packages from the cartons, the packages may be transferred to trays 13 as shown in Fig. 20 and the stamps automatically applied. The shaft 315 rotates at the same speed as the main cam shaft 39, the travel of the carton feed bars 20 and 20a being in excess of the distance between the window openings in the cartons.

A carton 10 placed against the stop prong 327a which is in the gauging position (see Figs. 1 and 19) and since carton 10 depresses the clutch-operating member 495 the clutch is engaged and the machine started. The first stamping operation takes place and the feed bars 20 and 20a move the carton to the left against the next stop 327b which in the meantime has assumed its gauging position (first sixty degrees of main cam shaft 39). The second stamping operation then takes place and carton is next moved to the left against stop prong 327c which in the meantime has assumed its gauging position (second sixty degrees of main cam shaft 39). Third stamping operation takes place and carton is advanced against stop prong 327d which in the meantime has assumed its gauging position (third sixty degrees of main cam shaft 39). The fourth stamping operation takes place and the carton is advanced to the left against the stop prong 327e which in the meantime has assumed its gauging position (fourth sixty degrees of main cam shaft 39). The fifth stamping operation takes place and the carton is advanced to the left against the stop strip 275a on end of table 275 (fifth sixty degrees of main cam shaft 39). The carton feed bars 20 and 20a remain lowered during the sixth sixty degrees of main cam shaft 39, and during these sixty degrees, the carton placed in front of pusher plate 276 is moved thereby into the position of carton 10 in Fig. 1 and the stamped carton is moved out of its path.

The continuous placing of cartons in front of pusher plate 276 before it moves toward the rear of the machine will keep the machine in continuous operation.

By this arrangement of radially disposed stop members on the slowly rotating shaft 315 the carton is halted accurately to enable the stamps to be affixed at definite predetermined positions. Any variation in the sizes of cigarette packages as used by different cigarette manufacturers can be compensated for by quickly substituting the shaft 315 for one provided with differently spaced stop members 327 to properly position the cigarette packages with respect to the pickers.

The operation of the clutch mechanism for starting the operation of the machine is controlled by the continuous manual placement of cartons, one after another at the proper time on table 275 behind the pusher plate 276. The carton clutch control means will now be described.

The end of rock arm 479 extending to the right, as viewed in Fig. 3, has a rod 489 connecting it to the arm 490 secured to rock shaft 491 mounted in three frame bearings 492. (Figs. 2, 3). An arm 493 secured to rock shaft 491 carries the starting rod 494 which extends upward through an opening in the carton feed table 275. To the upper end of rod 494 is secured the elongated carton-contacting member 495. The upper surface of member 495 tapers down toward the right (Fig. 8) or toward the front of the table and is located in a recess 496 so that its upper surface may be depressed flush with the upper surface of feed table 275 by the weight of the carton. A collar 497 secured on rod 494 limits the upward movement of the rod 494 by contacting with the under surface of feed table 275 (Fig. 8). With this arrangement, it is obvious that when the carton 10 depresses the member 495 the rock arm 479 will lower the rod 478 and release the clutch.

As the carton 10 travels to the left as viewed in Fig. 1, sufficiently to allow the member 495 to rise, the succeeding carton, moved in position by pusher plate 276, will depress the member 495 and the mechanism will be kept in motion as long as the pin 469 carried by gear 38 does not engage pin 465 of arm 463, the engagement of said pins 465 and 469 only occurring by failure to place a carton in position before the pusher plate 276.

It will be apparent that the movement of rod 494 under pressure of a carton is for engaging the clutch for starting purposes only, while the pin 469 carried by spur gear 38 is for stopping only.

In order that the various clutch-releasing members will be inactive and the clutch dog 405 will not be withdrawn from the notched opening 408 in the clutch plate 404 as long as cartons are continuously moved in place by pusher plate 276, the pin 469 is slidably mounted in spur gear 38 secured on main cam shaft 39, and as long as a carton is in place in front of pusher plate 276 to follow the preceding carton, before the spur gear 38 completes its cycle, the pin 469 will not project from the side of spur gear 38 so as to interfere with pin 465 of arm 463. The slidable pin 469 is moved to the position where it will contact pin 465 to thereby raise arm 463 by the shoe 499 which carries a push-rod 500 on stud 501. The free end of the push-rod 500 extends to the right through a slot 502 in frame 40 (see Fig. 8) and is moved to the left by a lug 503 of arm 504 by the action of cam plate 505 on periphery of cam 273 (Figs. 6, 7) only when the push-rod 500 is in the path of the lug 503. The push-rod 500 is in the path only when the carton-contacting member 495 is in its raised position.

An arm 506 (Fig. 8) secured to rock shaft 491 extends inside the frame 40 and carried on its inner end is the push-rod elevating member 507 having a slot 508 at its upper end through which the push-rod 500 passes. As a carton depresses the contacting member 495 to thereby rock shaft 491, the arm 506 swings upward lifting the push-rod 500 upwardly and out of the path of the lug 503 carried by arm 504 so that the pin 469 will not be moved to the left to project on the side of gear 38, the shoe 499 being held away from the gear by the action of springs 509.

When the pin 469 projects from the left side of gear 38 and the gear starts on its revolution, the pin 469, projecting from gear 38, is moved to the right by coming in contact with the circular cam strip 511 secured to the inside of frame 40 (see Fig. 9). As long as a carton is placed in front of pusher plate member 276 before the cycle of gear 38 is completed, the push-rod 500 will be out of the path of lug 503 carried by arm 504 actuated by the cam plate 505. When the carton contacting member 495 is not depressed, the push-rod 500 will be disposed in the path of lug 503 carried by arm 504 so that the pin 469 will be forced out of gear 38 to the left so as to engage the pin 465 of arm 463 thereby causing clutch stripping member 406 to descend, disengaging the clutch.

The downward movement of the carton-contacting member 495 or the upward movement of the arm 506 is prevented by the lower end 520 of arm 521 moving in the path of arm 506 when the waste backing receptacle has become full, releasing the arm 521 (Fig. 7), as will be explained in conjunction with the description of the waste paper receptacle and its associated elements.

*Backing sheet disposal means*

When all of the stamps have been removed from a sheet by the pickers 18 and 19, the moistening block carrying such vacant sheet is shifted by pusher arm 256 to a central or intermediate position in passage D of the channel 45. Here, as shown in Fig. 1, the moistening block, indicated at L, carrying the waste sheet is located in such a position that the sheet 14a borne by the block is so disposed that it will be engaged by the suction cup 21, then lifted thereby and carried to waste receptacle 23 where it is freed from the suction cup by being impaled upon a prong or pin 22 projecting upwardly within the receptacle.

Secured in rearwardly extending portion 360 of bracket 84a is a stud 359 carrying a link member 358 in which is secured the stud 357 which carries one end of the arm 346. The other end of arm 346 is carried on a stud 344 secured in the weight-transferring arm 108. A bushing 846 (Fig. 32) secured in arm 346 carries an arm 343. The arm 343 has an upwardly extending ear 347 carrying a spring-pressed member or pin 349 for holding arm 343 in proper operative relationship to arm 346. The free end of arm 343 carries the rubber suction cup 21, the same having a stem 341 adjustable in the clamp 342 on the end of arm 343 by means of clamp screw 851. The arm 343 also carries two downwardly extending prongs 361 for a purpose hereinafter described. The movement of the weight transferring arm 108 imparts a reciprocating movement through an arc to the arm 346 carrying arm 343.

With the mechanism as shown in Figs. 1 and 8, rubber suction cup 21 has been pressed down on the vacant or waste backing sheet, forcing the air from within the cup. As the weight-transferring arm 108 starts its upward movement it raises arms 346 and 343 together as a unit, creating a vacuum in the suction cup 21 which, by reason of its contact with the gummed surface of the waste backing sheet, lifts the backing sheet from the moistening pad L. Further movement of the weight-transferring arm 108 to the rear of the machine imparts a movement through an arc to arms 346 and 343. As the arc is completed, the suction cup 21 deposits the backing carried by it onto the vertically extending pin or prong 22 secured at its lower end in waste receptacle 23. The piercing of the backing sheet by the sharp end of vertical pin or prong 22 at once destroys whatver vacuum there may be in the suction cup 21, thereby causing the cup to immediately release the backing sheet leaving it impaled on the pin.

The return movement of the weight-transferring arm 108 returns arms 346 and 343 to their original position as shown in Fig. 8. As the suction cup 21 presses down on the next backing sheet to be picked up by it from a block located at station L, the prongs 361 carried by arm 343 force downwardly the backings previously deposited on the vertical pin 22. As the stack of backings deposited on pin 22 nears the bottom of the receptacle 23, it forces down the end of a tripping member 954, releasing the arm 521 under the tension of the spring 956. The lower end 520 of arm 521 moves toward and into the path of arm 506 of the starting mechanism when member 495 raises making it impossible to depress member 495 and start the machine without removing and replacing the receptacle 23.

The receptacle 23 is supported in an aperture 337 in the reservoir walls, the receptacle 23 having four supporting ears 340 with keyhole openings in each (Figs. 25 and 31). Four studs 339 enter the large portion of the keyhole openings so that the heads of the studs 339 protrude. When receptacle 23 is moved to the right, the narrow portions of the keyhole openings passing under the heads of studs 339, hold the receptacle down. A spring pressed button 960 keeps the receptacle in position when moved to the right. When placing the empty receptacle 23 down over the studs 339 and moving it to the right the spring pressed button rises to hold same in this position. In moving the receptacle 23 to the right, the tripping member 954 swings arm 521 so that the lower end 520 thereof is moved out of the path of arm 506 of the machine-starting mechanism and the machine may be set in motion again, once the emptied receptacle is placed in position.

To remove the receptacle for emptying requires that spring pressed pin 349 be pulled out and the arm 343 be swung upwardly to the position shown in Fig. 33 where it will remain since the button will rest in seat 355 provided for it on the arm 346. The arm 343 in such raised position is prevented from accidentally dropping down by the inclined face provided on a quadrant 356 near the end of arm 346. Button 960 is next pressed down, receptacle 23 is moved to the left and lifted out. After the replacement of receptacle 23, arm 343 is swung downwardly all the way. In its lowered position (Fig. 31) spring pin 349 will enter the hole 351 in the upwardly extending ear 352 of arm 346 thereby locking arms 343 and 346 together as a unit.

Operation

The operation of the machine is under the control of a single operator who is positioned in front of the table 275. When the machine is completely empty of decalcomania sheets; that is to say, there are no sheets resting on any of the moistening blocks in the machine, the first step is to feed a sufficient number of sheets into the machine to bring one of the blocks carrying a sheet into position at station G. This is done by feeding one sheet after another to plate 60 at properly timed intervals, at the same time maintaining member 495 depressed by hand to keep the machine in operation, until the first sheet reaches stamp-applying position at station G. Then a carton or tray containing the cigarette packages is placed in position by hand upon the feed bars 20 and 20a, with the left end of the carton placed against the stop member 327a. Now, as the machine starts, under the depression of member 495 by the carton, the pusher plate 276 will move away from the carton. Then a decalcomania sheet is placed on the plate 60 and a second carton placed behind the pusher plate with its left end against guide member 282. When the first carton has the affixment of the stamps to its packages completed, the ejecting bars 328 push it off bars 20 and 20a. At the same time pusher plate 276 swings rearwardly and pushes the second carton that was placed before it to a position over the feed bars 20 and 20a, shown in Fig. 1. One of the moistening blocks 16, having been relieved of the vacant sheet at the position L, and moved under plate 60, is then moved rearwardly by legs 62 at the same time that the sheet feed plate 63 moves the sheet engaged by it rearwardly also and off plate 60. As the sheet so moved gets beyond the edge of plate 60 in company with the block being moved by the legs 62, the sheet comes to rest on the foraminous upper surface of the block. The weight carrier 105 has lifted a weight 17 from the moistening block situated at the station F and carries the weight forward and deposits it on top of the sheet which has just been placed on the moistening block that has just moved from under the plate 60. The block progresses step by step in passage A moving the preceding blocks along before it, until it reaches station F where it is relieved of its weight 17. It next moves transversely of the machine toward the left in passage B under the impulse of pusher member 132 until it reaches the left end of said passage when, under the actuation of pusher arm 152, it begins its travel in passage C toward the front of the machine, until it reaches a position under the pickers 18 and 19, where the stamps are picked off, two at a time, and applied to two packages at a time in the carton or tray then on the table 275 above the feed bars 20 and 20a, said bars at the time being in a lowered position. When all of the stamps have been taken from the sheet, the block is moved toward the right in passage D to the intermediate position indicated at L where the waste backing sheet 14a is lifted off by the suction picker 21 and deposited in the waste receptacle 23 in the manner previously explained. When completing a run, no sheets are fed for the last ten cartons so that the last ten sheets in the machine will be thus used up, leaving no unused stamps in the machine at the end of the day's operation.

The machine is entirely automatic in operation and requires merely the continuous substantially simultaneous feeding of the cartons and decalcomania sheets to keep it in operation, as the maintenance of the clutch mechanism in engaged position is dependent upon the depression of clutch control member 495 by a carton on table 275. Should the operator fail to place a carton in position, the clutch will disengage and the machine cease operating until a carton is placed in position on table 275 over the clutch operating member 495. Also, when the waste receptacle 23 is full of the waste sheets, the clutch will be held in disengaged position until pressure on member 954 at the bottom of the receptacle 23 is relieved by the removal of the waste contents of the receptacle. Moreover, if an operator should fail to replace the waste receptacle after having removed it for the purpose of emptying it, clutch cannot be engaged to start the machine due to the position of arm 521. All therefore, that an operator of the machine is required to do, is to feed the cartons and decalcomania sheets to the machine and remove the cartons carrying the packages that have received the decalcomanias when said cartons are ejected onto the left end of the table 275 by the action of the ejecting bars 326.

The machine has been herein described as intended for the application of decalcomania tax stamps to cigarette packages, but it will be understood that the same may be readily used for the application of tax stamps or decalcomanias of any other form to other articles without departing from the spirit of the invention. For example, in Fig. 34, the manner in which the machine may, without material modification, apply tax stamps, small decalcomania labels or the like to wrapped cigars, is shown. There, a row of wrapped cigars 975 is held at one end against a fixed support 976, the row being fed toward the pickers 18 and 19, in the direction of arrow 977 either by hand or by a suitable conveyor means. The two cigars nearest the pickers receive the first two stamps taken from the decalcomania sheet by the pickers, which apply the same to the cigar wrappers as indicated in dotted lines at 978. The two cigars which have thus received the stamps are then fed to the left as indicated by the arrow 979, and the next two cigars in row 975 are pushed toward the pickers for the application of the next two stamps by the pickers. This operation continues indefinitely, the cigars each receiving a stamp as they are fed to the pickers.

From the foregoing it will be clear that many modifications may be made without departing from the spirit of the invention. The machine as designed at the present time, is made to accommodate the stamps and cigarette packing arrangements as the same are now supplied to the trade. Larger sheets containing a greater number of stamps can be easily handled by the provision of larger moistening blocks and associated parts to handle them. Cigarette packages independent of the cartons and trays or other packages, can easily be stamped by the provision of simple conveying means to present the independent packages to the pickers. By other slight modifications any requirement to meet trade changes in packing methods can be made without impairing the efficiency of the machine or departing from the principles of operation herein described.

What I claim is:

1. In a machine of the character described, mechanism for supplying moisture to loosen a decalomania from a backing sheet, and mechanism for applying the loosened decalcomania to an article at a position remote from the moisture-supplying means.

2. In a machine of the character described, mechanism for successively loosening decalcomanias from a single backing sheet by an application of moisture, and mechanism for successively applying said decalcomanias to successive articles at a position remote from the moisture-supplying means.

3. In a machine of the character described, means for moistening a backing sheet containing a plurality of decalcomanias to thereby loosen the decalcomanias from the backing sheet, and means for simultaneously removing several decalcomanias from said backing sheet and carrying them to a position remote from the moistening means and simultaneously applying said several decalcomanias to several articles.

4. In a machine of the character described, an article support, means for loosening a decalcomania from its backing, and means for bodily carrying the decalcomania away from its backing to an article on the article support and applying the decalcomania to the article.

5. In a machine of the character described, an article support, means for applying moisture to a backed decalcomania to thereby loosen said decalcomania from its backing, and means for carrying the decalcomania away from its backing to a position adjacent the article support and applying the decalcomania to the article on said support.

6. In a machine of the character described, an article support, means for applying moisture to a backed decalcomania to thereby loosen said decalcomania from its backing, and means for transferring the decalcomania from its position on the backing to a position remote from the moisture-supplying means and applying it to the surface of the article on the support.

7. In a machine of the character described, an article support, means for carrying a backed decalcomania, means for applying moisture to said decalcomania to thereby separate said decalcomania from its backing while said decalcomania is being carried, and means for lifting the decalcomania away from its backing and carrying it to and applying it on the surface of the article on the support.

8. In a machine of the character described, means for carrying a backing decalomania, means for supplying moisture to the backing of said decalcomania to thereby cause the decalcomania to become loosened from its backing, means for picking up the loosened decalcomania and carrying it bodily away from its backing to an article for application thereto, and means for removing the backing from the carrying means.

9. In a machine of the character described, means for carrying a backed decalcomania and supplying moisture thereto to cause the decalcomania to become loosened from its backing, and means for engaging the loosened decalcomania and sliding it to the edge of the backing and then lifting it to separate it from and then carry it away from the backing.

10. In a machine of the character described, means for supplying moisture to a backed decalcomania to cause the decalcomania to become loosened from its backing, and means for separating the decalcomania from its backing by sliding at least a portion of it beyond the edge of the backing.

11. In a machine of the character described, means for supplying moisture to a backed decalcomania to cause the decalcomania to become loosened from its backing, suction means for engaging said loosened decalcomania, sliding at least a part of the same beyond the edge of the backing and then raising the decalcomania and carrying it away from the backing.

12. In a machine of the character described, an article support, means for supporting a backed decalcomania, means for supplying moisture to said decalcomania to thereby loosen the same from its backing, means for picking up the loosened decalcomania and carrying it away from its backing to an article on said support and applying it to said article, means for removing the backing from its support and carrying it away from the same, and means for receiving and holding the backing thus carried away.

13. In a machine of the character described, an article support, means for subjecting decalcomanias to moisture whereby said decalcomanias are loosened from a single backing sheet on which they are attached, and means for simultaneously applying more than one of the detached decalcomanias to more than one of the articles on the article support.

14. In a machine of the character described, an article support, means for progressively moving a container holding a number of articles on said support, means for loosening a number of decalcomanias from a single backing sheet on which they are adhesively attached, means for simultaneously bodily removing several decalcomanias from said backing sheet and carrying them to and simultaneously applying them to several articles in the container.

15. In a machine of the character described, an article support, means for progressively moving a container holding a number of like articles on said support, means for carrying a backing sheet bearing a number of decalcomanias, means for supplying moisture to the backing sheet and decalcomanias to thereby loosen the decalcomanias from the backing sheet, means for successively removing said decalcomanias from the backing sheet and applying them to successive articles in the container on the article support, and means for removing the backing sheet from its carrying means when the decalcomanias on said sheet have been removed therefrom.

16. In a machine of the character described, means for supporting and carrying a backed decalcomania, means for supplying moisture to said decalcomania to thereby loosen the same from its backing sheet, suction means for engaging the decalcomania and moving at least a part of it beyond the edge of the backing sheet with a sliding movement and then lifting it and leaving the waste backing sheet on its support, an article support on which an article is located while the decalcomania is applied by said suction means, means for lifting the waste backing sheet from its supporting and carrying means, and a receptacle to which the waste sheet is carried by said lifting means.

17. In a machine of the character described, an article support, a decalcomania support, means for supplying moisture to a backed decalcomania on said decalcomania support to thereby loosen the decalcomania from its backing sheet, means for separating said decalcomania from its backing sheet by sliding a portion of it beyond the edge of said backing sheet, and means for moving said decalcomania-separating means to cause it to apply the decalcomania carried by it to an article on the article support.

18. In a machine of the character described, a support on which a moistened, backed decalcomania is positioned, suction means for engaging the upper face of the decalcomania, means for moving said suction means to cause it to slide a portion of the decalcomania beyond the edge of its backing sheet, and means for then lifting the suction means to cause the decalcomania carried by it to be raised and carried away from the backing sheet.

19. In a machine of the character described, a moving support on which a moistened, paper-backed decalcomania is carried, means for supplying moisture to said decalcomania and its backing sheet while on said support to thereby loosen the decalcomania from its backing sheet, means for holding the decalcomania and backing sheet on said support during the application of moisture thereto, a suction picker to which the decalcomania is brought by its support, means for moving said suction picker to cause it to slide the decalcomania to a position slightly beyond the edge of the backing sheet and then lift the decalcomania away from the backing sheet, an article support by which an article to which the decalcomania is to be applied is moved, means for causing the suction picker to apply the decalcomania carried by it to an article on the article support, means for lifting the backing sheet from the decalcomania support, and a receptacle to which the backing sheet is carried by the last-mentioned means.

20. In a machine of the character described, a moving moistened support, means for feeding a paper-backed decalcomania to said support, means for holding said decalcomania on said support in position to receive moisture therefrom to thereby loosen the decalcomania from its paper backing, picker mechanism to which the decalcomania is carried by said moving support, means for causing the picker mechanism to remove the decalcomania from its backing and carry it away, an article support on which an article is positioned to receive the decalcomania from the picker mechanism, and sheet-removing means for carrying the stripped backing sheet away from the moving moistened support.

21. In a machine of the character described, a support on which a plurality of moistened decalcomanias in spaced relationship on a backing sheet is located, suction pickers for engaging at least two of said decalcomanias simultaneously while the same are resting on the support, means for moving said pickers apart to cause the same to move the decalcomanias engaged by them toward the opposite edges of the backing sheet, an article support on which the articles intended to receive the decalcomanias rest, and means for raising and then lowering the pickers to cause them to apply the decalcomanias carried by them to at least two of the articles on the support.

22. In a machine of the character described, a support on which a moistened backing sheet holding a plurality of decalcomanias in spaced relationship rests, suction pickers for engaging at least two of said decalcomanias simultaneously while the same are resting upon the support, means for moving said pickers apart while the same are engaging the decalcomanias to thereby move the decalcomanias engaged by the pickers to the edges of the backing sheet, an article support on which the articles intended for the reception of the decalcomanias rest, means for raising and then lowering the pickers to cause them to apply the decalcomanias carried by them to at least two of the articles on the support, and means for causing the pickers to be maintained in the same spaced relationship during application of the decalcomanias as that in which they were located when first engaging the decalcomanias while said decalcomanias were resting on their backing sheet.

23. In a machine of the character described, a support on which a plurality of spaced decalcomanias on a backing sheet is located, a pair of suction pickers for engaging two of said decalcomanias and removing the same from the backing sheet, means for moving the pickers to cause them to apply the stamps carried by them to two articles, means for supporting said articles during application of the decalcomanias, and means for causing the pickers to apply the decalcomanias carried by them to two articles in spaced relationship different from that in which the decalcomanias were arranged on the backing sheet from which they were picked up by the pickers.

24. In a machine of the character described, a support for a moistened decalcomania sheet on which a plurality of spaced decalcomanias are resting, a picker for engaging a decalcomania on said sheet and separating it therefrom by sliding it to a point where it projects beyond the edge of said sheet and then lifting it, and an article support on which an article is located and to which the decalcomania held by the picker is brought by said picker and applied to said article.

25. In a machine of the character described, a support for a moistened decalcomania sheet bearing several rows of spaced decalcomanias, suction means simultaneously engaging a decalcomania in each row and separating the decalcomanias so engaged from the sheet by sliding said decalcomanias away from one another to the opposite edges of the sheet and then lifting the decalcomanias, a support for articles intended to receive the decalcomanias, means for moving the suction means to said articles and causing said suction means to apply the decalcomanias carried by it to the articles, means for intermittently shifting the sheet-carrying support to successively bring decalcomanias on the sheet in position to be picked up by the suction means, and means for shifting articles on the article-support to bring the same into decalcomania-receiving position.

26. In a machine of the character described, a support for a moistened decalcomania sheet bearing a plurality of spaced decalcomanias, a pair of pickers for simultaneously engaging two decalcomanias on the sheet while the sheet is on its support, means for moving the two pickers away from one another while they are in engagement with the decalcomanias and while the decalcomanias so engaged are resting on the sheet and causing said pickers to move the decalcomanias away from one another to the opposite edges of the sheet, a support for a receptacle containing a number of similar articles, means for raising and swinging the pickers through an arc to cause them to carry the decalcomanias and bring them down on two of the articles contained in said receptacle, means for bringing said pickers into predetermined spaced relationship at the point of application of the decalcomanias to the articles, and means by which the spacing of the pickers at said point of application of the decalcomanias to the articles may be regulated.

27. In a machine of the character described, means for supporting a moistened decalcomania backing sheet on which a decalcomania is supported, means for removing said decalcomania from the surface of the sheet, said last mentioned means including an element for engaging the upper face of the decalcomania and sliding it so that a part of it extends beyond the edge of the sheet and then lifting it away from the sheet.

28. In a machine of the character described, means for supporting a moistened decalcomania backing sheet on which a decalcomania is supported, means for removing said decalcomania from the surface of the sheet including a suction picker for engaging the upper face of the decalcomania and sliding it to the edge of the sheet and then lifting it, said picker having a ribbed face.

29. In a machine of the character described, a support for a moistened decalcomania sheet bearing spaced decalcomanias in rows, suction pickers for simultaneously engaging a decalcomania in each row and separating the decalcomania so engaged from the sheet by sliding said decalcomanias to the edges of the sheet and then lifting the decalcomanias, a support for articles intended to receive the decalcomanias, means for moving the suction pickers to said articles and causing said pickers to apply the decalcomanias carried by them to said articles, means for intermittently shifting the sheet-carrying support to successively bring decalcomanias on the sheet into position to be picked up by the suction means, means for shifting the articles on the support to bring the same into decalcomania-receiving position, and means for removing the sheet from its support after the decalcomanias have all been taken from said sheet by the pickers.

30. In a machine of the character described, a support for a moistened decalcomania sheet bearing a plurality of spaced decalcomanias, a pair of pickers for simultaneously engaging two decalcomanias on the sheet while the sheet is on its support, means for moving the two pickers away from one another while they are in engagement with the decalcomanias and while said decalcomanias so engaged are resting on the sheet and causing said pickers to move the decalcomanias away from one another to the opposite edges of the sheet, a support for a receptacle containing a number of similar articles, means for raising the pickers to cause them to carry the decalcomanias and bring them down on two of the articles in said receptacle, means for bringing said pickers into predetermined spaced relationship at the point of application of the decalcomanias to the articles, means by which the spacing of the pickers at said point of application of the decalcomanias to the articles may be regulated, means for shifting the receptacle intermittently on its support to cause it to bring articles in the receptacle into decalcomania-receiving position, means for removing the sheet from its support after the decalcomanias have been taken from the sheet by the pickers and means for moving the receptacle from its support after all of the articles in said receptacle have received a decalcomania from the pickers.

31. In a machine of the character described, a support for a moistened decalcomania sheet bearing a plurality of decalcomanias, a pair of suction pickers for simultaneously picking up two decalcomanias at a time from the sheet, an article support, means for moving the pickers from the sheet to the surfaces of articles located on the support, means for spreading said pickers apart while the same are engaging decalcomanias on the sheet whereby said decalcomanias are slid on the face of said sheet by the pickers to the opposite edges of the sheet, stops and springs for limiting the extent of separation of the pickers when said pickers are applying the decalcomanias to the articles, a swinging arm, and means thereon for receiving a cam to regulate the extent of separation of the pickers during decalcomania application and hold the pickers in a position in which the stops are inoperative.

32. A machine of the character described having a passage in which a plurality of decalcomania sheet-conveying members travel, sheet-conveying members movable in said passage, means for moving said members in said passage through a predetermined path of travel, means for supplying moisture to said members whereby the sheets carried by said members receive moisture from the members and become saturated and thereby cause the decalcomanias on said sheet to loosen from their backing, means for holding down the decalcomanias flat on the upper faces of said members for a predetermined distance during the travel of said members, pickers for removing the decalcomanias from each sheet during halts in the travel of the member on which said sheet is supported, a support on which articles intended to receive the decalcomanias is positioned, means for intermittently moving said articles on the support, means for moving the pickers to cause the same to apply the decalcomanias carried by them during halts in the movement of the articles on the support, a waste-sheet receptacle, means for removing a sheet from which the decalcomanias have been taken, from its supporting member and depositing it in said waste-sheet receptacle, and means for feeding successive sheets to the sheet-conveying members.

33. In a machine of the character described, means for feeding a decalcomania sheet, conveying means for receiving a sheet from the feeding means and carrying it, moistening means for moistening the sheet while the same is being conveyed to thereby loosen the decalcomanias on the sheet, means for supplying moisture to said moistening means, means resting on top of the sheet to hold the same flat on the conveying means, decalcomania-applying means including members for lifting the decalcomanias from the sheet while said sheet is on the conveying means and carrying said decalcomanias to an article and applying it thereto, means for moving the sheet away from the decalcomania-applying means after the decalcomanias have been removed from said sheet by said decalcomania-applying means, sheet-removing means to which the waste sheet is moved, and means for receiving the waste sheet from said sheet-removing means.

34. In a machine of the character described, a water-holding channel, absorbent blocks movable in said channel and receiving moisture therefrom, means on each of said blocks for receiving and holding a decalcomania sheet in position to receive moisture from the block, pressure means resting on the sheets while said sheets are on the blocks for at least a portion of the period of travel of the blocks in the channel, means for applying and removing said pressure means to and from the sheets, an article support on which articles intended to receive the application of decalcomanias from the sheets are carried, picker means for removing decalcomanias from the sheets while said sheets rest on the blocks and applying said decalcomanias to the articles on the article support, a suction picker device for lifting the sheets from the blocks after the decalcomanias have been removed from said sheets, and a waste receptacle to which said waste sheets are carried by the suction picker device.

35. In a machine of the character described, a water-holding channel, moistening blocks movable in said channel, means for feeding a decalcomania sheet to a position on top of each of said blocks, picker mechanism, means for moving the moistening blocks from position of decalcomania sheet reception to said picker mechanism, means for feeding articles to a position where the articles can receive decalcomanias from the picker mechanism, means for removing the decalcomania sheets from the moistening blocks after the decalcomanias have been removed from said sheets by the picker mechanism, means for moving the articles from their position of decalcomania reception after the articles have received the decalcomanias from the picker mechanism, and means for stopping operation of the machine when no articles are on the article support.

36. In a machine of the character described, an article support for receiving articles intended for the reception of decalcomanias, means for moving articles on said support to a position of decalcomania reception, means for moistening a decalcomania sheet to loosen the decalcomania therefrom, means for receiving the decalcomania and carrying it bodily away from the sheet and applying it to an article on the support, drive mechanism for the article-moving and decalcomania-applying means, said drive mechanism being operative only when an article is on the support.

37. In a machine of the character described, an article support for receiving articles intended for the reception of decalcomanias, means for moving articles on said support to a position of decalcomania reception, means for moistening a decalcomania sheet to loosen a decalcomania therefrom, means for receiving the decalcomania and carrying it bodily away from the sheet and applying it to an article on the support, drive mechanism for the article-moving and decalcomania-applying means, said drive mechanism being operative only when an article is on the support, a receptacle for waste sheets, and means for rendering said drive mechanism ineffective when the receptacle is full of waste sheets or is out of its operative position.

38. In a machine of the character described, means for applying a decalcomania to an article, decalcomania sheet-feeding means, a channel connecting said sheet-feeding means with the decalcomania-applying means, and absorbent members travelling in said channel from the sheet-feeding means to the decalcomania-applying means, said absorbent members receiving sheets from the feeding means and supplying moisture to them and carrying them in moistened condition to the decalcomania-applying means.

39. In a machine of the character described, a water-holding channel, absorbent members travelling therein and receiving and retaining water received from the channel, means for supplying decalcomania sheets to a position on top of said members whereby said sheets receive moisture therefrom, and decalcomania-applying means to which the moistened sheets are carried by the absorbent members.

40. In a machine of the character described, a water-holding channel, means for maintaining a supply of water therein, absorbent members travelling in said channel and receiving water therefrom, means for moving said absorbent members intermittently in said channel, means for supplying decalcomania sheets to a position on said members whereby said sheets receive moisture therefrom, means for holding the sheets on said members for at least a portion of the period of travel of each of said members in the channel, and decalcomania-applying means to which the moistened sheets are carried by the absorbent members.

41. In a machine of the character described, a water-holding channel, means for maintaining a supply of water therein, sheet-carriers travelling in said channel and receiving water therefrom, means for moving said carriers intermittently in said channel, means for supplying decalcomania sheets to a position on top of said carriers whereby said sheets receive moisture therefrom, weights resting on top of the sheets on the carriers for at least a portion of the period of travel of the carriers in the channel, means for shifting said weights from one carrier to another, and decalcomania-applying means to which moistened sheets are conveyed by the carriers.

42. In a machine of the character described, a continuous water-holding channel, a plurality of absorbent blocks disposed in said channel, means for intermittently moving said blocks in the channel, means for feeding a decalcomania sheet to a position of rest on top of each of the blocks whereby it will receive moisture from the block, means for holding down the sheet on the block during a portion of the period of travel of the block in the channel, means for shifting the holding-down means from one block to another, decalcomania-applying means to which the sheets are carried by the blocks after the means for holding down the sheets has been removed, and means for removing the waste sheets from the blocks after the decalcomania-applying means has removed the decalcomanias from the sheets carried by the blocks.

43. In a machine of the character described, an absorbent member for carrying a decalcomania sheet, means for supplying moisture to said member to cause the same to thereby moisten the sheet carried by it to loosen the decalcomania borne by the sheet, and means for removing the loosened decalcomania and carrying it away from the sheet.

44. In a machine of the character described, means for moistening a decalcomania sheet to loosen the decalcomania thereon from its backing, means for moving said decalcomania bodily from the backing and applying it to an article, a receptacle for containing waste backings, means for carrying said backings to the receptacle, said means including a suction picker, and a pin in the waste backing receptacle on which the backings carried to the receptacle by the picker are impaled.

45. In a machine of the character described, means for moistening a decalcomania sheet to loosen the decalcomania thereon from its backing, means for removing the decalcomania from its backing, a receptacle for receiving waste backings, means for carrying said backings to said receptacle, said means including a suction picker, a pin in the waste backing receptacle on which the backings carried to the receptacle by the picker are impaled, said pin being positioned to break the suctional adherence of the picker to the backing sheet when said sheet is impaled upon the pin by the picker.

46. In a machine of the character described, a support for a moistened decalcomania sheet, means for removing the decalcomania from said sheet leaving a waste backing on the support, a receptacle for receiving the waste backing, a pin in said receptacle having a pointed end, a suction cup for engaging the waste backing and carrying it to the receptacle and bringing it downwardly on the pointed end of the pin to impale it thereon, and means for subsequently forcing the backing further downwardly on the pin.

47. In a machine of the character described, means for supplying moisture to loosen a decalcomania from a backing sheet, means for applying the decalcomania to an article, a receptacle for the vacant backing sheet from which the decalcomania has been removed, a pin in said receptacle, and means for carrying the vacant backing sheet to the pin and impaling it thereon.

48. In a machine of the character described, means for applying moisture to loosen a decalcomania from a backing sheet, means for applying the decalcomania to an article, a receptacle for receiving the vacant backing sheet, a pin in said receptacle, means for carrying the vacant sheet to the pin and impaling it thereon, and means for thereafter forcing the sheet downward on the pin.

49. In a machine of the character described, means for supplying moisture to loosen a decalcomania from a backing sheet, means for applying the decalcomania to an article, a receptacle for receiving the vacant backing sheet, a pin in said receptacle, means for carrying the vacant backing sheet to the receptacle and impaling it on the pin, means for thereafter forcing the sheet downward on the pin, and means at the lower end of said pin for preventing operation of the machine when said means is actuated by the weight of sheets impaled on the pin.

50. In a machine of the character described, means for supplying moisture to loosen a decalcomania from its backing sheet, means for applying the decalcomania to an article, a receptacle for holding waste backing sheets, said receptacle being provided with a pin upon which the waste backing sheets are successively impaled, a swinging arm carrying a suction cup for engaging the face of a waste backing sheet and conveying it to the receptacle and impaling it on the pin therein, the pin being positioned to penetrate the sheet at a point within the portion of the sheet engaged by the cup to thereby destroy the adherence of said cup to the sheet, and means carried by the arm for forcing the sheets downwardly on the pin when the suction cup is swung away from a position over the pin.

51. In a machine of the character described, a continuous water-holding passage, means for maintaining a predetermined quantity of water in said channel, absorbent blocks in said channel, means for moving said blocks intermittently therein, means for supplying a decalcomania sheet to each of said blocks whereby said sheets receive moisture from the blocks, means for holding down the sheets on the blocks for a portion of the period of travel of the blocks in the channel, suction pickers for removing the decalcomanias from the sheets, an article support, means for moving articles thereon into position to receive the decalcomanias from the pickers, a waste receptacle for receiving the waste backing sheets from which the decalcomanias have been removed, said receptacle being provided with a pin upon which the waste backing sheets are successively impaled, a swinging arm carrying a suction cup for engaging the face of a waste backing sheet and conveying it to the receptacle and impaling it on the pin therein, the pin being positioned to penetrate the sheet at a point located within the area of the portion of the sheet engaged by the cup to thereby destroy the adherence of said cup to the sheet, and means carried by the arm for forcing the sheets downwardly on the pin when the suction cup is swung away from a position over the pin.

52. In a machine of the character described, decalcomania-applying means, and means for supplying said decalcomania-applying means with moistened decalcomania sheets, said supplying means comprising moistened blocks supporting the decalcomania sheets on their upper faces.

53. In a machine of the character described, decalcomania-applying means, and means for supplying said decalcomania-applying means with moistened decalcomania sheets, said supplying means comprising blocks filled with absorbent material and moved in a water-filled channel from which the absorbent material receives moisture, said blocks each having a foraminous top upon which a decalcomania sheet is carried and through which the sheet receives moisture from the absorbent material in the block.

54. In a machine of the character described, decalcomania-applying means, means for supplying said decalcomania-applying means with moistened decalcomania sheets, said supplying means including absorbent members moved in a water-filled channel and receiving moisture therefrom, means for depositing a sheet on top of each of said absorbent members, means for depositing a weight on top of each of the sheets, and means for removing said weights from each of the sheets at a predetermined point in the travel of each member in the channel.

55. In a machine of the character described, means for supplying moisture to a decalcomania sheet to loosen it from its backing, said means including a moistened support on which the sheet rests, means for moving said support through a predetermined path of travel, means for engaging the decalcomanias on said sheet while the sheet is on the moistened support and holding said decalcomanias properly positioned with respect to one another on the sheet, means for freeing the decalcomania-engaging means from its contact with the decalcomanias at a predetermined point in the path of travel of the moistened support, and decalcomania-applying means to which the moistened decalcomania sheet is brought by the moistened support.

56. In a machine of the character described, a plurality of sheet supports upon which moistened decalcomania sheets are transported, means resting on top of said sheets and holding the same down on the supports while being carried thereby, means for moving the supports, sheet-moving means for bringing sheets and supports together with the sheets disposed on top of the supports, means for bringing sheet-holding means to rest on top of the sheets at the position where the sheets are brought into superimposed relationship with the supports and means for removing said sheet-holding means from off the supports at a predetermined position in the movement of the supports.

57. In a machine of the character described, a support for a receptacle containing a number of articles arranged in rows, each of said articles being intended to receive a decalcomania, decalcomania-applying means for applying a decalcomania to each of the articles, means for supplying a decalcomania sheet bearing rows of decalcomania stamps to the decalcomania-applying means, means for shifting the decalcomania sheet with respect to the decalcomania-applying means to thereby present successive decalcomanias in the rows on the sheet to said decalcomania-applying means for application to the articles, and means for shifting the receptacle in a direction opposite to that in which the sheet is shifted to present successive articles in the receptacle to decalcomania-reception position.

58. In a machine of the character described, a clutch for governing machine operation, a support for articles to receive decalcomanias, means co-operating with said support for causing clutch engagement only when an article is positioned on the support, means for receiving waste decalcomania sheets from which decalcomanias have been taken and applied to articles on the support, and means controlled by said waste-sheet receiving means for preventing clutch engagement when said waste-sheet receiving means is full of waste sheets and requires emptying.

59. In a machine of the character described, means for moistening a decalcomania sheet to loosen the decalcomanias thereon from its backing, means for engaging the loosened decalcomania and sliding it on the face of the sheet to one edge of the sheet until at least one half of the decalcomania is drawn beyond the edge of the sheet and then lifting the decalcomania, and a support for an article intended to receive the decalcomania so removed from its backing.

60. In a machine of the character described, decalcomania-applying means, a support on which articles to receive the decalcomanias are located, means for shifting the articles on said support to bring them successively into decalcomania-receiving position, means for locating the articles in proper decalcomania-receiving position, said locating means including a rotating shaft provided with spaced radially extending stops against which the articles are brought into contact by the shifting means, and means for rotating said shaft.

61. In a machine of the character described, decalcomania-applying means, a support for receiving a receptacle containing a plurality of articles intended for the reception of decalcomanias from the decalcomania-applying means, means for intermittently moving the receptacle toward the decalcomania-applying means, means for positioning the receptacle in proper successive decalcomania-receiving positions to enable successive articles in said receptacle to receive decalcomanias from the decalcomania-applying means, said positioning means including a rotating shaft provided with spaced radially-extending stops against which the receptacle is brought on successive movements of the receptacle-moving means, means for rotating said shaft, and coupling means between said rotating means and the shaft whereby said shaft may be substituted by another carrying differently spaced stops.

62. In a machine of the character described, a sheet-feeding device for depositing a decalcomania sheet upon top of a conveyor element, means for moistening said sheet while the same rests upon the conveyor element, a distant decalcomania-applying mechanism to which the moistened sheet is carried by the conveyor element, means for moving the conveyor element to cause it to bring the sheet carried by it to the decalcomania-applying mechanism, a carton support, means for intermittently shifting a carton on said support to bring articles contained in said carton to position of decalcomania reception from the decalcomania-applying mechanism, means for moving the conveyor element to one side of the decalcomania-applying mechanism after the decalcomanias have been removed from the sheet carried by the conveyor element, means for engaging the waste sheet remaining on the conveyor element and lifting it therefrom, a waste receptacle to which said sheet is carried by the lifting means, and a sheet-feeding mechanism to which the conveyor element is moved after the waste sheet has been lifted from it by the sheet-lifting means.

63. In a machine of the character described, a table upon which a carton containing articles to receive decalcomanias is supported, a water-containing channel extending away from said table, said channel having a pair of spaced, rearwardly extending passages connected at their ends by forward and rearward transversely extending passages respectively, a plurality of moistening blocks moving in the passages of the channel, means for moving said blocks rearwardly in one of the rearwardly extending passages, means for holding a decalcomania sheet on top of each of the blocks while the same are being moved rearwardly in said passage and removing said holding means from the block when each block reaches the rear end of the passage, means for moving the blocks from which the holding means has been removed through the rearward transverse passage, means for then moving said blocks forwardly through the second rearwardly extending passage, decalcomania-applying means located at the forward end of the last mentioned passage for removing the decalcomanias from the sheets supported on the moistening blocks when said blocks successively reach the forward end of said passage and applying the decalcomanias to articles in the carton, means for moving the blocks through the forward transverse passage away from the decalcomania-applying means and toward the forward end of the first rearwardly extending passage, and a waste-sheet removing means operative to remove waste backing sheets from the blocks while said blocks are positioned in the forward transverse passage.

FRANCIS X. MALOCSAY.